United States Patent
Liu et al.

(10) Patent No.: US 10,154,198 B2
(45) Date of Patent: Dec. 11, 2018

(54) POWER SAVING TECHNIQUES FOR AN IMAGE CAPTURE DEVICE

(71) Applicant: QUALCOMM Incorporated, San Diego, CA (US)

(72) Inventors: Jun Liu, Irvine, CA (US); Tao Shen, San Diego, CA (US); Wenbiao Wang, San Diego, CA (US); Ying Xie Noyes, San Diego, CA (US); Hengzhou Ding, San Diego, CA (US); Ho Sang Lee, San Diego, CA (US); Yonggui Mao, San Diego, CA (US); Wei Zou, San Diego, CA (US); Rengaraj Thirupathi, San Diego, CA (US); Aravind Bhaskara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/585,874

(22) Filed: May 3, 2017

(65) Prior Publication Data

US 2018/0124317 A1   May 3, 2018

Related U.S. Application Data

(60) Provisional application No. 62/414,262, filed on Oct. 28, 2016.

(51) Int. Cl.
*H04N 5/232* (2006.01)
*G06K 9/46* (2006.01)
(Continued)

(52) U.S. Cl.
CPC ....... *H04N 5/23245* (2013.01); *G06F 1/3206* (2013.01); *G06F 1/3287* (2013.01);
(Continued)

(58) Field of Classification Search
CPC .................. H04N 5/23245; G06F 1/3206
(Continued)

(56) References Cited

U.S. PATENT DOCUMENTS

| 7,075,577 | B2 | 7/2006 | Tang |
| 8,477,211 | B2 | 7/2013 | Morihisa |

(Continued)

FOREIGN PATENT DOCUMENTS

| WO | 2010100320 A1 | 9/2010 |
| WO | 2016123415 A1 | 8/2016 |

OTHER PUBLICATIONS

International Search Report and Written Opinion—PCT/US2017/050979—ISA/EPO—dated Nov. 24, 2017—15 pp.

*Primary Examiner* — Joel W Fosselman
(74) *Attorney, Agent, or Firm* — Shumaker & Sieffert, P.A.

(57) ABSTRACT

An image capture device that includes an adjustment circuit configured to monitor image parameters, generate updated image settings for the image capture device in response to the monitored image parameters, and transmit the updated image settings to one or more processors. The updated image settings configure the one or more processors to determine whether to transition the image capture device from a dynamic scene mode to a static scene mode based on a first image parameter included in the monitored image parameters, wherein the first image parameter is different from a second image parameter used to determine to transition the image capture device from the static scene mode to the dynamic scene mode, and to suspend generation of all or less than all of the updated image settings in response to determining to transition the image capture device from the dynamic scene mode to the static scene mode.

30 Claims, 19 Drawing Sheets

(51) Int. Cl.
*G06K 9/62* (2006.01)
*H04N 5/235* (2006.01)
*H04N 9/04* (2006.01)
*H04N 9/73* (2006.01)
*G06F 1/32* (2006.01)
*H04M 1/73* (2006.01)
*H04N 5/351* (2011.01)

(52) U.S. Cl.
CPC ......... *G06K 9/4652* (2013.01); *G06K 9/6202* (2013.01); *G06K 9/6298* (2013.01); *H04N 5/2352* (2013.01); *H04N 5/23203* (2013.01); *H04N 5/23212* (2013.01); *H04N 5/23241* (2013.01); *H04N 9/04* (2013.01); *H04N 9/73* (2013.01); *H04M 1/73* (2013.01); *H04N 5/23251* (2013.01); *H04N 5/351* (2013.01); *H04N 9/735* (2013.01)

(58) Field of Classification Search
USPC ...................................................... 348/222.1
See application file for complete search history.

(56) References Cited

U.S. PATENT DOCUMENTS

| | | | |
|---|---|---|---|
| 9,237,314 B2 | 1/2016 | Wu | |
| 2004/0008272 A1 | 1/2004 | Tang | |
| 2010/0097517 A1 | 4/2010 | Koh | |
| 2010/0225779 A1* | 9/2010 | Muukki | H04N 5/232 348/223.1 |
| 2012/0120247 A1* | 5/2012 | Kao | H04N 5/23241 348/169 |
| 2012/0262592 A1 | 10/2012 | Rabii | |
| 2014/0085493 A1 | 3/2014 | Petrescu et al. | |
| 2016/0360176 A1 | 12/2016 | Nikhara et al. | |

* cited by examiner

Parameters to Control the Stats DFS

| Parameter Name | Android property | Default value |
|---|---|---|
| Skipping period P | persist.camera.static.skip_fra me | 32 |
| Wait frame number WF | persist.camera.static.wait_fra me | 5 |

- Skipping period P is the subsampling rate, the DFS module only forward one BG STAT event every P frame.
- Wait frame number is how many frames the skipping will start after AEC exposure index is fixed. In the duration, AWB/flicker less algorithms will finish their adjustment.

FIG. 11

Alternative Method to Determine Dynamic Scene from BG Stats

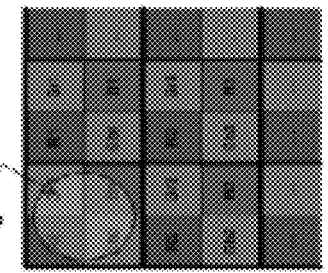

2x2 pixels as a group

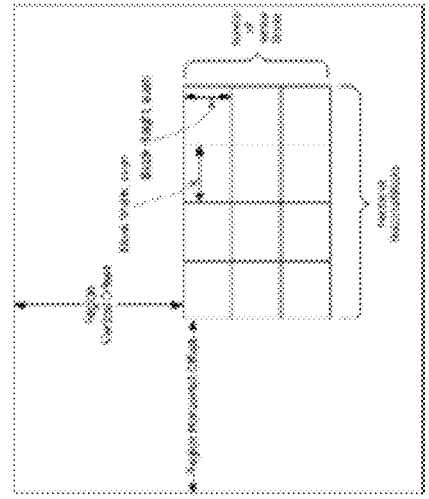

- CFS computes correlation between Bayer Grid (BG) Statistics of current and previously used statistics frame
- Bayer Grid Statistics have the following information
  - Typically 64x48 (3072) statistics are provided per channel
  - Each entry contains sum and count of R, B, Gr, Gb pixels
- CFS subsamples to use just 256 samples
- CFS computes correlation between Gr average array of current and previously used frame $$\rho_{xy} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

FIG. 14

POWER SAVING TECHNIQUES FOR AN IMAGE CAPTURE DEVICE

This application claims the benefit of U.S. Provisional Application Ser. No. 62/414,262, filed Oct. 28, 2016, the entire content of which is incorporated herein by reference.

TECHNICAL FIELD

This disclosure generally relates to power saving techniques for an image capture device.

BACKGROUND

Image capture devices, such as digital cameras included in smart phones, digital video cameras or digital still cameras, may be used in different applications and environments. An image capture device may be capable of producing imagery under a variety of lighting conditions. For example, image capture devices may operate in environments that include large amounts of reflected or saturated light, as well as in environments that include high levels of contrast. Current smartphones cameras include a 3 A adjustment module (auto exposure, auto white balance, auto focus) in addition to other modules (e.g. tint adjustment module) to adjust the imaging signal processor (ISP) hardware and have become more and more sophisticated.

SUMMARY

In general, this disclosure describes example power saving techniques for an image capture device. In one example, in order to reduce consumption of battery power during operation of a digital camera, the present disclosure describes example techniques to reduce power consumption when the device is operating in certain static scene situations. For example, once the device is operating in a static scene mode, the system may transition from the static scene mode back to a dynamic scene mode under certain conditions indicative of changes in light conditions or scene content changes. When in a static scene situation, the light condition may be relatively stable and scene content frame to frame may be similar. When in a dynamic scene situation, the light condition is changing because the light source orientation or location with respect to an imaging sensor is changing, or there may be moving objects in the field of view. In order to compensate for the light change and enhance user experience, a 3 A adjustment may be applied instantaneously according to the light conditions in the dynamic scene mode. The power saving technique of the present disclosure may switch between a static scene mode and a dynamic scene mode in order to achieve a balance between power usage and user experience. The power saving techniques of the present disclosure may be implemented in such a way so as to reduce the impact on the user experience in terms of adjustment delay.

In one example, an image capture device comprises an adjustment circuit configured to monitor image parameters, generate updated image settings for the image capture device based on the monitored image parameters, and transmit the updated image settings; and one or more processors configured to receive the transmitted updated image settings from the adjustment circuit, wherein the received updated image settings comprise instructions for configuring the one or more processors to perform image processing of the image capture device, and wherein the updated image settings configure the one or more processors to: determine to transition the image capture device from a dynamic scene mode to a static scene mode based on a first image parameter included in the monitored image parameters, wherein the first image parameter used to determine to transition the image capture device from the dynamic scene mode to the static scene mode is different than a second image parameter that the one or more processors use to determine to transition the image capture device from the static scene mode to the dynamic scene mode, cause the adjustment circuit to suspend generation of all or less than all of the updated image settings in response to determining to transition the image capture device from the dynamic scene mode to the static scene mode, and transition the image capture device from the dynamic scene mode to the static scene mode.

In another example, a method of operation in an image capture device comprises monitoring, by an adjustment circuit, image parameters, generating updated image settings for the image capture device based on the monitored image parameters, and transmitting the updated image settings; receiving, by one or more processors, the transmitted updated image settings from the adjustment circuit, wherein the received updated image settings comprise instructions for configuring the one or more processors to perform image processing of the image capture device; determining to transition the image capture device from a dynamic scene mode to a static scene mode based on a first image parameter of the monitored image parameters, wherein the first image parameter used to determine to transition the image capture device from the dynamic scene mode to the static scene mode is different from a second image parameter used to determine to transition the image capture device from the static scene mode to the dynamic scene mode; suspending generation of all or less than all of the updated image settings in response to determining to transition the image capture device from the dynamic scene mode to the static scene mode; and transitioning the image capture device from the dynamic scene mode to the static scene mode.

In another example, a computer-readable medium storing instructions that, when executed, cause one or more processors to: monitor image parameters, generate updated image settings for an image capture device based on the monitored image parameters and transmit the updated image settings; receive the transmitted updated image settings, wherein the received updated image settings comprise instructions for configuring the one or more processors to perform image processing of the image capture device; determine to transition the image capture device from a dynamic scene mode to a static scene mode based on a first image parameter included in the monitored image parameters, wherein the first image parameter used to determine to transition the image capture device from the dynamic scene mode to the static scene mode is different from a second image parameter used to transition the image capture device from the static scene mode to the dynamic scene mode; suspend generation of all or less than all of the updated image settings in response to determining to transition the image capture device from the dynamic scene mode to the static scene mode; and transition the image capture device from the dynamic scene mode to the static scene mode.

In another example, an image capture device comprises means for monitoring image parameters, generating updated image settings for the image capture device based on the monitored image parameters and transmitting the updated image settings; means for receiving the transmitted updated image settings, wherein the received updated image settings comprise instructions for configuring one or more processors to perform image processing of the image capture device; means for determining to transition the image capture device from a dynamic scene mode to a static scene mode based on a first image parameter included in the monitored image parameters, wherein the first image parameter used to determine to transition the image capture device from the dynamic scene mode to the static scene mode is different from a second image parameter used to determine to transition the image capture device from the static scene mode to the dynamic scene mode; means for suspending generation of all or less than all of the updated image settings in response to determining to transition the image capture device from the dynamic scene mode to the static scene mode; and means for transitioning the image capture device from the dynamic scene mode to the static scene mode.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 11 is a table of control parameters that may be implemented in one or more techniques for transitioning between a static scene mode and a dynamic scene mode, according to an example of the present disclosure described in this disclosure.

FIG. 14 is a schematic diagram of determining whether an image capture device is in a dynamic scene mode using a relative correlation coefficients calculation, according to an example of the present disclosure described in this disclosure.

DETAILED DESCRIPTION

Figure 1:
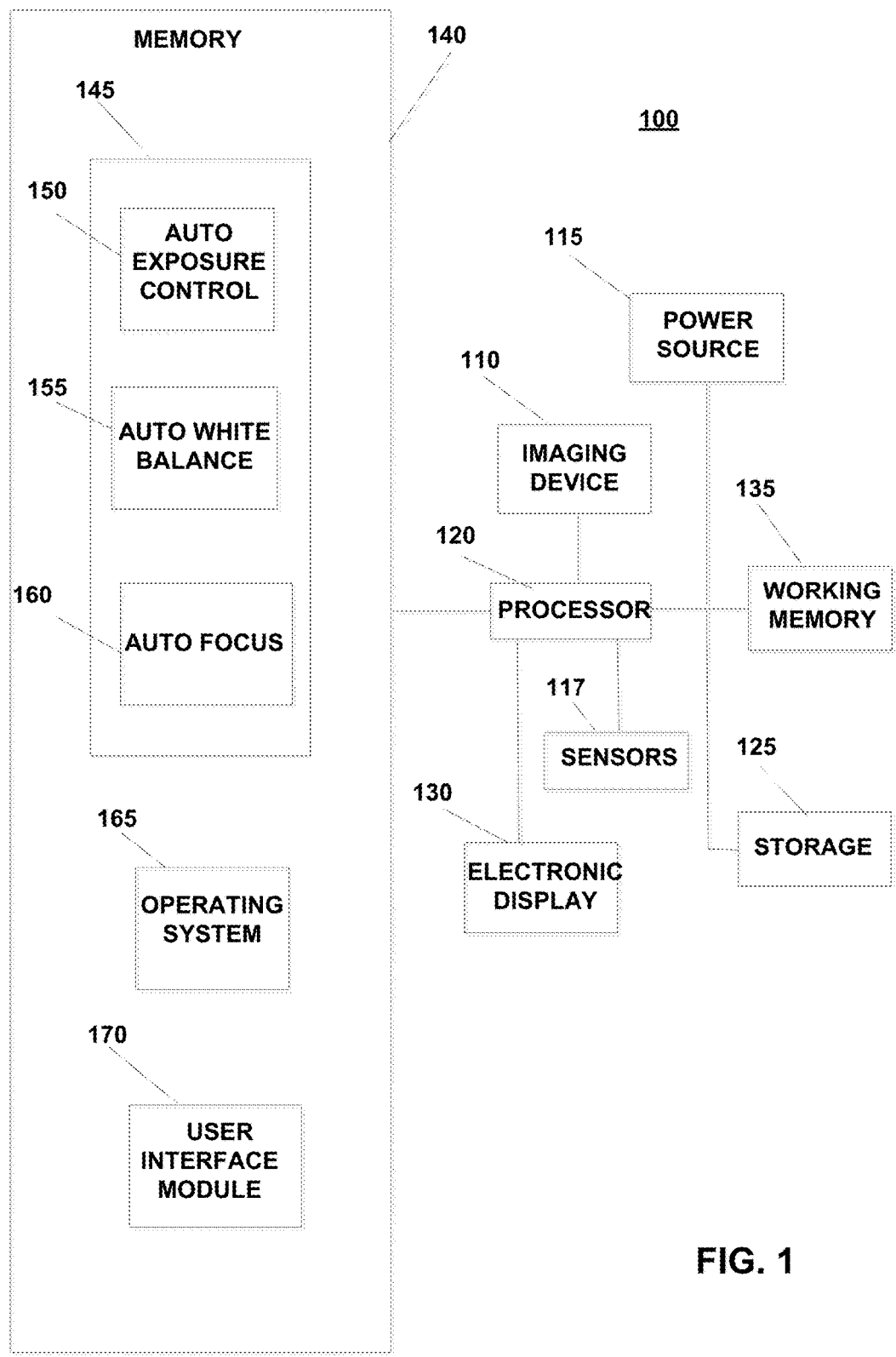
FIG. 1 is a block diagram depicting an example image capture device for implementing a power saving technique, according to an example of the present disclosure.

This disclosure describes techniques for reducing power consumption in an image capture device, such as a digital camera included in a smartphone device, for example. In order to reduce consumption of battery power during use of a camera in a smartphone system, for example, the present disclosure proposes techniques for reducing power consumption by transitioning from a dynamic scene mode to a static scene mode when the device is operating in certain static scene situations. Once the device is operating in the static scene mode, the system may transition from the static scene mode back to the dynamic scene mode under certain conditions indicative of changes in light conditions or scene content changes, for example. When in a static scene situation, the light condition may be relatively stable and scene content from frame to frame may be similar. When in a dynamic scene situation, the light condition is changing because the light source orientation or location with respect to an imaging sensor is changing, or there may be moving objects in the field of view. In order to compensate for the light change and enhance user experience, a 3 A adjustment may be applied instantaneously according to the light conditions in the dynamic scene mode. The power saving technique of the present disclosure may switch between a static scene mode and a dynamic scene mode in order to achieve a balance between power usage and user experience. The proposed power saving technique of the present disclosure may be implemented in such a way so as to reduce the impact on the user experience in terms of adjustment delay. For example, when in the static scene mode, the amount of time required for the device to transition from the static scene mode back to the dynamic scene mode may vary depending on changes in light conditions, rather than being dependent upon a timer, as described below. In addition, the parameters used to determine whether to transition from the dynamic scene mode to the static scene mode may be different from the parameters used to determine whether to transition from the static scene mode back to the dynamic scene mode, as described below.

For example, while the image capture device is in the dynamic scene mode, during which each of an auto exposure control module, an auto white balance module, and an auto focus module are operating, an adjustment circuit monitors image capture parameters associated with all three modules, and based on the monitored image parameters generates updated image setting for the image capture device, and transmits the updated image settings to one or more processors that are configured to receive the transmitted updated image settings. The received updated image settings include instructions for configuring the one or more processors to perform image processing of the image capture device. For example, the updated image setting may configure the one or more processors to determine to transition the image capture device from a dynamic scene mode to a static scene mode based on a first image parameter included in the monitored image parameters. The first image parameter used to determine to transition the image capture device from the dynamic scene mode to the static scene mode may be different from a second image parameter that the one or more processors use to determine to transition the image capture device from the static scene mode to the dynamic scene mode. In one example, if it is determined that the image capture device should transition from the dynamic scene mode to the static scene mode, the one or more processors may cause the adjustment circuit to suspend generation of all or less than all of the updated image settings, and transition the image capture device from the dynamic scene mode to the static scene mode.

If the one or more processors determine, while in the dynamic scene mode, that the image capture device should not transition from the dynamic scene mode to the static scene mode, the adjustment circuit generates, using all three modules, updated image settings that include processor configuration instructions and transmits the updated image settings to the one or more processors. Therefore, during operation in the dynamic scene mode, the configuration of the processor continues to be adjusted based on the current updated image settings received from the adjustment circuit using all three modules, and during operation in the static scene mode the configuration of the processor continues to be adjusted based on the current updated image settings received from the adjustment circuit using less than all or none of the three modules.

On the other hand, if it is determined, while in the dynamic scene mode, that the image capture device should transition from the dynamic scene mode to the static scene mode, the auto white balance module and the autofocus module may be disabled or turned off, so that only the auto exposure control module continues generating parameters when the image capture device is in the static scene mode, thereby reducing power consumption while in the static scene mode. Once in the static scene mode, the image capture device stores current updated image settings and the one or more processors determine to transition from the static scene mode back to the dynamic scene mode based only on the auto exposure control parameters.

If it is determined, while in the static scene mode, that the image capture device should not transition from the static scene mode back to the dynamic scene mode but rather remain in the static scene mode, the image capture device continues sending the stored current updated image settings to the one or more processors and the process continues in the static scene mode with the same stored updated image settings being utilized over and over by the one or more processors so that the instructions for configuring the one or more processors remain the same while in the static scene mode. In this way, disabling or turning off the auto white balance module and the autofocus module, so that only the auto exposure control module continues generating parameters, and suspending updating of image settings and using the same updated image settings in the one or more processors results in a power savings for the image capture device while in the static scene mode.

If it is determined, while in the static scene mode, that the image capture device should transition from the static scene mode back to the dynamic scene mode, the one or more processors may cause the adjustment circuit to restart generation of image settings updates based on monitoring of image capture parameters associated with using all of the control modules, so that the one or more processors receive and are configured by the generated updated image settings received from the adjustment circuit subsequent to causing the adjustment circuit to restart generation of updated image settings.

According to another example, determining whether to transition from the dynamic scene mode to the static scene mode is the same as in the example described above. However, when it is determined that the image capture device should transition from the dynamic scene mode to the static scene mode, each of the auto exposure control module, the auto white balance module and the autofocus module may be disabled or turned off, and the most recent generated current image settings are stored. In order to determine to transition from the static scene mode back to the dynamic scene mode while all of the control modules are disabled, other information may be utilized, such as raw statistics messages in a Bayer grid domain, for example. If it is determined that the image capture device should not transition from the static scene mode back to the dynamic scene mode but rather remain in the static scene mode, the stored current updated image settings may be sent to the one or more processors, and the process continues in the static scene mode using the same stored updated image settings so that the instructions for configuring the one or more processors remain the same while the image capture device is in the static scene mode. In this way, having the adjustment module disabled or turn off all of the control modules and repeatedly using the same updated image settings that were stored subsequent to suspending all of the modules for configuring the processor results in a power savings for the image capture device while in the static scene mode.

On the other hand, when it is determined, based on the raw statistics messages in the Bayer domain, for example, that the image capture device should transition from the static scene mode back to the dynamic scene mode, the one or more processors may cause the adjustment circuit to restart generation of the updated image settings based on monitoring of image capture parameters associated with all of the three modules.

FIG. 1 is a block diagram depicting an example image capture device for implementing a power saving technique, according to an example of the present disclosure. The illustrated embodiment is not meant to be limiting, but is rather illustrative of certain components in some embodiments. An image capture device according to the present application may include a variety of other components for other functions which are not shown for clarity of the illustrated components.

As illustrated in FIG. 1, according to one example, an image capture device 100, such as a digital camera included in a smartphone device may include an imaging device 110 and an electronic display 130. Imaging device 110 corresponds to specific hardware for processing input data, which is in Bayer patterns, received from one or a combination of imaging sensors 117 into full RGB colored images for display by electronic display 130 using a procedure known as demosaicing. Other functions may be included within imaging device 110, such as denoising, RGB gain adjustment, chromatic aberration correction, and so forth. Certain examples of electronic display 130 may include flat panel display technology, such as an LED, LCD, plasma, or projection screen, or a display of a smartphone device. Electronic display 130 may be coupled to a processor 120 for receiving information for visual display to a user. Such information may include, but is not limited to, visual representations of files stored in a memory location, software applications installed on the processor 120, user interfaces, and network-accessible content objects. The processor 120 may be a CPU in a smartphone system, and may execute software associated with adjustment parameters utilized by imaging device 110. Processor 120 may be used to calculate imaging parameters, and imaging device 110 may be the hardware associated with loading the parameters to processing data in bayer patterns from sensors 117 and generate RGB full colored images.

The image capture device 100 may further include the processor 120 linked to the imaging device 110, and a power source 115. A working memory 135, electronic display 130, and a program memory 140 are also in communication with processor 120. While described in FIG. 1 as being a digital camera included in a smartphone device, the image capture device 100 of the present disclosure may be a mobile device, such as a tablet, laptop computer, or other cellular telephone device. In some examples, image capture device 100 may be a standalone system such as in a standalone digital camera that is not necessarily part of another device.

Processor 120 may be a general purpose processing unit or may be a processor specially designed for imaging applications for a handheld electronic device. As shown, the processor 120 is connected to, and in data communication with, program memory 140 and a working memory 135. In some examples, the working memory 135 may be incorporated in the processor 120, for example, cache memory. The working memory 135 may also be a component separate from the processor 120 and coupled to the processor 120, for example, using one or more RAM or DRAM components. In other words, although FIG. 1 illustrates two memory components, including program memory 140 having several modules and separate working memory 135, other memory architectures are possible. For example, a design may utilize ROM or static RAM memory for the storage of processor instructions implementing the modules contained in program memory 140. The processor instructions may then be loaded into RAM to facilitate execution by the processor. For example, working memory 135 may be a RAM memory, with instructions loaded into working memory 135 before execution by the processor 120.

In the illustrated example, the program memory 140 may include a 3 A adjustment circuit 145 for executing an adjustment circuit, an operating system 165, and a user interface module 170. 3 A adjustment circuit 145 may include an auto exposure control (AEC) module 150, an auto white balance module 155, and an auto focus module 160. These modules may include instructions that configure the processor 120 to perform various image processing and device management tasks, including the power saving techniques of the present disclosure. Program memory 140 can be any suitable computer-readable storage medium, such as a non-transitory storage medium. Working memory 135 may be used by processor 120 to store a working set of processor instructions contained in the modules of memory 140. Alternatively, working memory 135 may also be used by processor 120 to store dynamic data created during the operation of image capture device 100.

As mentioned above, processor 120 may be configured by several modules stored in program memory 140. In other words, processor 120 may run instructions stored in modules in program memory 140. 3 A adjustment circuit 145 may include instructions that configure the processor 120 to implement a power saving technique in accordance with the present disclosure. Therefore, processor 120, along with 3 A adjustment circuit 145, imaging device 110, and working memory 135, represent one means for implementing a power saving technique for an image capture device for reducing power consumption from power source 115 according to the present disclosure.

Auto exposure control module 150 may include instructions for configuring or calculating and storing an auto exposure setting of the image capture device 100. Auto white balance module 155 may include instructions for configuring or calculating and storing an auto white balance setting of the image capture device 100, and auto focus module 160 may include instructions for configuring or calculating and storing an auto focus setting of the image capture device 100. According to example of the present disclosure, the current settings of auto exposure control module 150, auto white balance module 155, and auto focus module 160 may be utilized to implement a power saving technique for image capture device 100.

Figure 6:
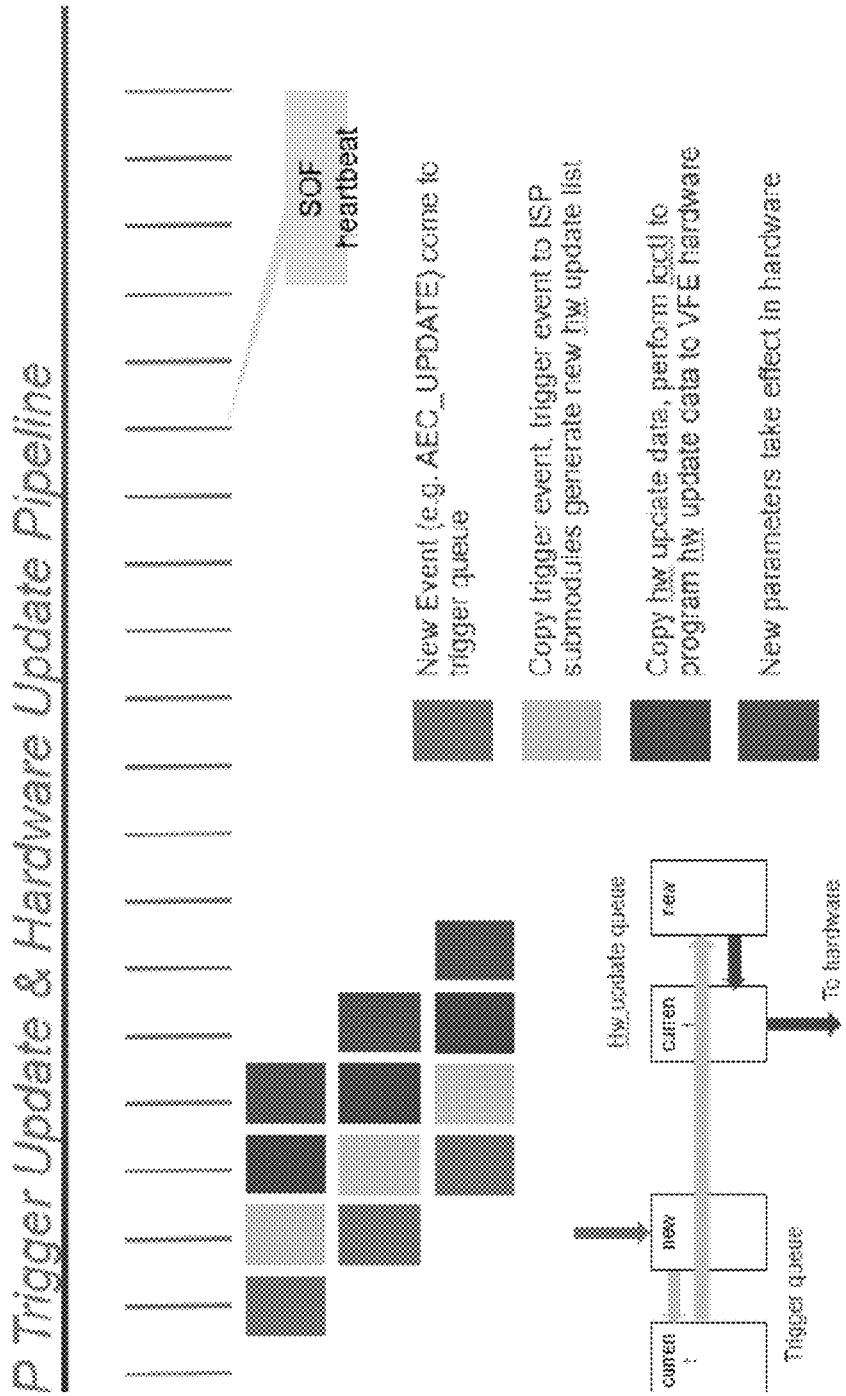
FIG. 6 is a schematic diagram of updating imaging parameters during transitioning between a static scene mode and a dynamic scene mode, according to an example of the present disclosure described in this disclosure.
Figure 15:
FIG. 15 is a schematic diagram of a message list of raw statistics messages to describe frame information for transitioning between a static scene mode and a dynamic scene mode, according to an example of the present disclosure described in this disclosure.

Imaging device 110 may send raw statistics messages in a Bayer domain to describe the frame information from processor 120 to auto exposure control module 150, auto white balance module 155 and auto focus module 160. Examples of those raw statistics messages are listed FIG. 15. 3 A control modules 145, due to execution on processor 120, may cause processor 120 to analyze the raw statistics messages and calculate imaging parameters, such as sensor gain, R/G/B gain, lens position for focus, etc., based on the raw statistics messages. The calculated imaging parameters may be updated to the imaging device 110 and sensor 117 to adjust imaging procedures in the sensor 117 and imaging device 110, resulting in improved imaging quality. The update procedure may include multiple steps, such as a trigger update, hardware Lookup Table (LUT) update, so on An adjustment delay of the 3 A adjustment circuit 145 is associated with the period of time between when the processor 120 begins updating image parameters and the time when those parameters take effect in imaging device 110, and may include a parameter calculation time and a period of time for the imaging device 110 to reload those parameters. In order to achieve quality user experience, the adjustment delay of the 3 A adjustment circuit 145 may be designed to be a predefined parameter (e.g. 1.3 ms). This may require that the 3 A adjustment circuit 145 run on a per frame basis, which places an increased usage burden on processor 120, and may result in an increased amount of battery power being utilized. In some examples, 3 A adjustment circuit 145 may be configured in such a way so as to reduce the power consumption. According to one example, in order to reduce adjustment delay, a pipeline technique is applied to update imaging parameters, as illustrated in FIG. 6. In this example, any imaging parameters from 3 A modules 150,155, and 160 may be applied to sensor 117 and imaging device 110 in 4 frames, which is equivalent to 1.3 ms if the frame rate is 30 Hz.

Figure 2:
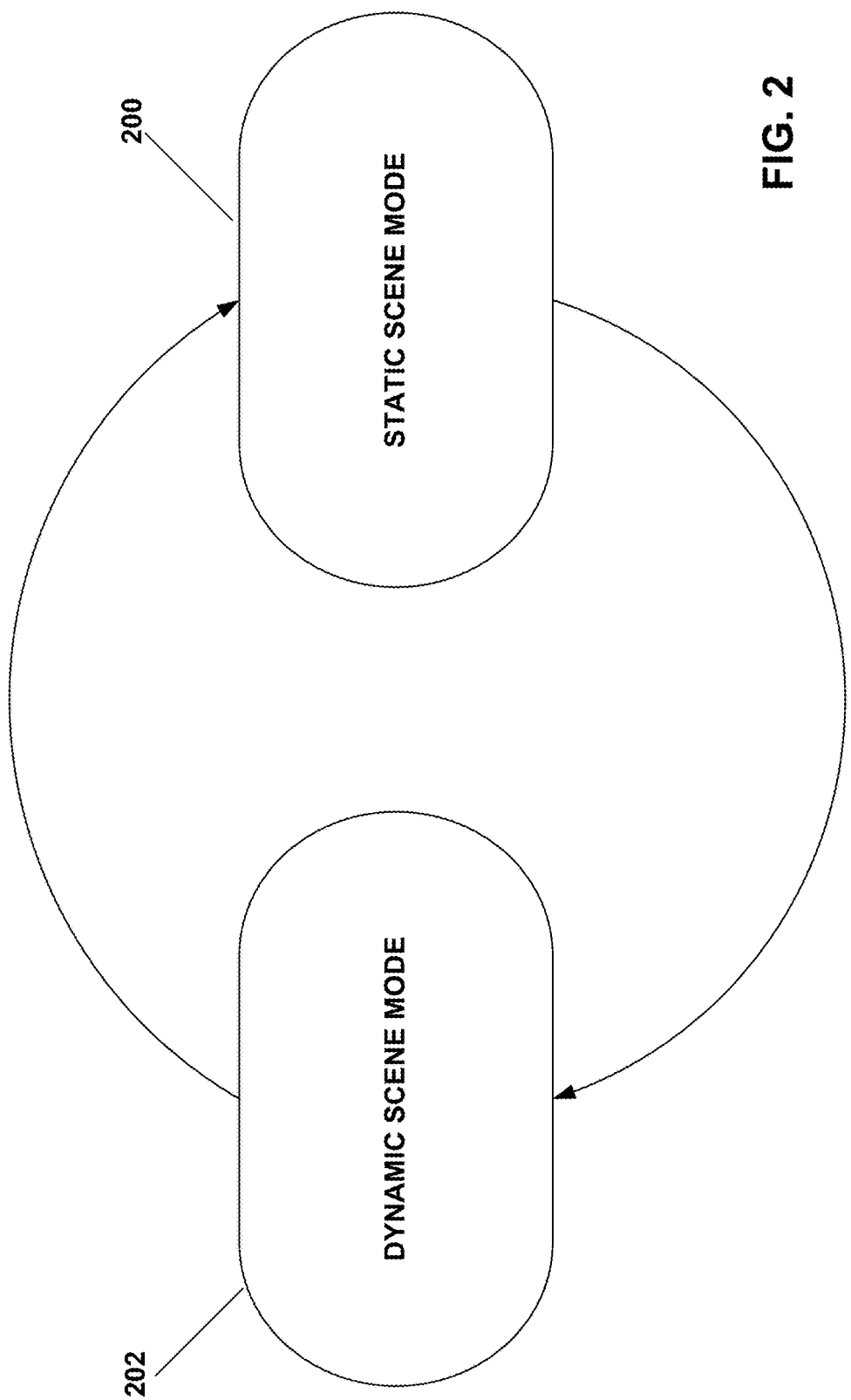
FIG. 2 is a schematic diagram of transitioning between a static scene mode and a dynamic scene mode in an image capture device, according to an example of the present disclosure.

For example, when image capture device 100 determines, based on the current settings of 3 A adjustment circuit 145 stored in working memory 135, for example, that the device is in a static scene mode, the processor 120 may cause the image capture device 100 to transition to a lower power mode associated with the static scene mode. During operation in the lower power mode associated with the static scene mode, the device may transition from the lower power mode to a normal power mode associated with the dynamic scene mode when image capture device 100 determines that the device is in a dynamic scene power mode, as illustrated in FIG. 2 and as will be described below. Therefore, processor 120, along with the stored settings from 3 A adjustment circuit 145, represent one way for implementing a power saving technique for image capture device 100 that includes transitioning between the dynamic scene mode and the static scene mode.

In this way, in one example, an adjustment circuit of an image capture device may be configured to monitor image parameters, generate updated image settings for the image capture device based on the monitored image parameters, and transmit the updated image settings to one or more processors configured to receive the transmitted updated image settings from the adjustment circuit. The received updated image settings may include instructions for configuring the one or more processors to perform image processing of the image capture device. The received updated image settings may configure the one or more processors to: determine to transition the image capture device from a dynamic scene mode to a static scene mode based on a first image parameter included in the monitored image parameters that is different from a second image parameter that the one or more processors use to determine to transition the image capture device from the static scene mode to the dynamic scene mode, cause the adjustment circuit to suspend generation of all or less than all of the updated image settings in response to determining to transition the image capture device from the dynamic scene mode to the static scene mode, and transition the image capture device from the dynamic scene mode to the static scene mode.

In another example, the image parameters may include a first set of image parameters, and the monitored image parameters may include a first set of monitored image parameters, and subsequent to the transition of the image capture device from the dynamic scene mode to the static scene mode, the adjustment circuit is configured to monitor a second set of image parameters. Subsequent to the transition of the image capture device from the dynamic scene mode to the static scene mode, the one or more processors may be configured to: determine to transition the image capture device from the static scene mode to the dynamic scene mode based on the second image parameter included in the second set of image parameters, and transition the image capture device from the static scene mode to the dynamic scene mode.

In another example, the one or more processors may be configured to cause the adjustment circuit to restart generation of updated image settings in response to determining to transition the image capture device from the static scene mode to the dynamic scene mode, and receive and be configured by the updated image settings generated by the adjustment circuit subsequent to causing the adjustment circuit to restart generation of updated image settings.

In another example, the second image parameter may be an exposure index of a current frame, and wherein to determine whether to transition the image capture device from the static scene mode to the dynamic scene mode based on the second image parameter, the one or more processors may be configured to: compare the exposure index of the current frame to an exposure index of a previous frame, and determine to transition from the static scene mode to the dynamic scene mode in response to the exposure index of the current frame being approximately equal to the exposure index of the previous frame.

In another example, the second image parameter may be R/G/B channel intensity, and wherein to determine to transition the image capture device from the static scene mode to the dynamic scene mode based on the second image parameter, the one or more processors may be configured to: determine, while in the static scene mode, a difference of the R/G/B channel intensity in corresponding regions between a current frame and a previous frame, generate a difference image based on the difference, compare values in the difference image to a difference range threshold, and determine to transition from the static scene mode to the dynamic scene mode based on to the comparing.

Program memory 140 may also include a user interface module 170. The user interface module 170 illustrated in FIG. 1 may include instructions that configure the processor 120 to provide a collection of on-display objects and soft controls that allow the user to interact with the device, such as allowing the user to select regions of interest identified and displayed in a preview mode of the image capture device. The user interface module 170 also allows applications to interact with the rest of the system. An operating system module 165 may also reside in program memory 140 and operate with processor 120 to manage the memory and processing resources of the image capture device 100. For example, operating system 165 may include device drivers to manage hardware resources such as the electronic display 130 or imaging device 110. In some embodiments, instructions contained in 3 A adjustment circuit 145 may not interact with these hardware resources directly, but instead interact through standard subroutines or APIs located in operating system 165. Instructions within operating system 165 may then interact directly with these hardware components.

Processor 120 may write data to storage module 125. While storage module 125 is represented graphically as a traditional disk drive, other example could include a disk-based storage device or one of several other types of storage mediums, including a memory disk, USB drive, flash drive, security digit (SD) card, remotely connected storage medium, virtual disk driver, or the like.

Although FIG. 1 depicts a device comprising separate components to include a processor, imaging device, electronic display, and memory, these separate components may be combined in a variety of ways to achieve particular design objectives. For example, the memory components may be combined with processor components to save cost and improve performance.

Additionally, although FIG. 1 illustrates two memory components, including memory component 140 comprising several modules and a separate memory 135 comprising a working memory, other memory architectures are possible. For example, a design may utilize ROM or static RAM memory for the storage of processor instructions implementing the modules contained in memory 140. Alternatively, processor instructions may be read at system startup from a disk storage device that is integrated into image capture device 100 or connected via an external device port. The processor instructions may then be loaded into RAM to facilitate execution by the processor. For example, working memory 135 may be a RAM memory, with instructions loaded into working memory 135 before execution by the processor 120.

In order to reduce consumption of battery power during use of a camera in a smartphone system, for example, the present disclosure describes techniques for reducing power consumption when the device is operating in certain static scene situations. However, the system may transition from the static scene mode back to a dynamic scene mode under certain conditions indicative of increased light conditions changes or scene content changes. The proposed power saving technique of the present disclosure may be implemented in such a way so as to reduce the impact on the user experience in term of adjustment delay associated with the amount of time from when the processor 120 begins updating image parameters to the time when the updated parameters take effect in the imaging device 110. In the example illustrated in FIG. 7, where the pipeline has a length associated with four time frames, if the adjustment delay is fixed at 1.32 ms, transfer from the static mode to the dynamic mode may occur in 0.33 ms. As illustrated in FIGS. 2-5, according to one example of the present disclosure, a dynamic scene may be detected based on raw statistics messages from imaging device 110. As illustrated in FIGS. 9-12, according to another example of the present disclosure, a dynamic scene may be detected by the AEC module 150.

Figure 3:
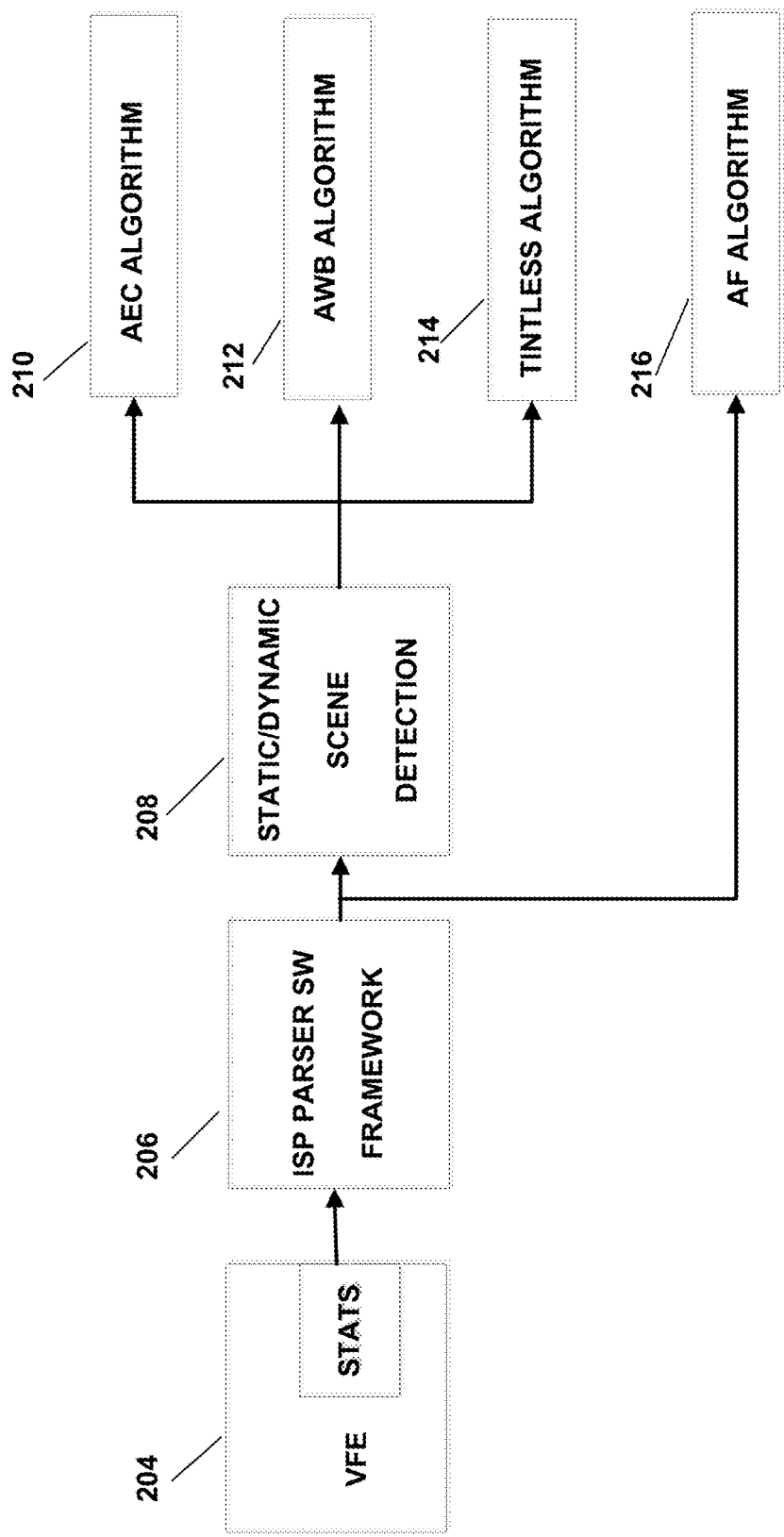
FIG. 3 is a block diagram illustrating an example device that may implement one or more techniques for transitioning between a static scene mode and a dynamic scene mode, according to an example of the present disclosure described in this disclosure.

FIG. 2 is a schematic diagram of state transitioning between a static scene mode and a dynamic scene mode in an example power saving technique for an image capture device, according to an example of the present disclosure. As illustrated in FIG. 2, image capture device 100 may operate in one of two modes: a static scene mode 200 and dynamic scene mode 202. In static scene mode 200, all the modules, including 3 A adjustment modules 150-160, and other hardware program modules, such as processor 120, may be utilized to adjust exposure (i.e. sensor gain), R/G/B gains, lens positions of the camera hardware are paused, and previous adjusted optimal parameters are re-used in the sensor 117 and imaging device 110 so that the system transitions to a lower power mode. In static scene mode 200, other power saving methods may also be applied, such as sub-sampling the raw statistics messages to the 3 A adjustment circuit 145 from 30 Hz to 15 Hz Or 7.8 HZ, for example, and therefore, the trigger frequency of the modules are also reduced and the CPU utility is reduced. FIG. 3 is a block diagram illustrating an example device that may implement one or more techniques for transitioning between a static scene mode and a dynamic scene mode, according to an example of the present disclosure described in this disclosure. As illustrated in FIG. 3, imaging device hardware 204 generates a statistics (STATS) message based on input received from sensors 117, that is parsed by a parser software framework 206 into a software format to generate imaging parameters that are used in static/dynamic scene detection 208 to determine control of an AEC algorithm 210, an AWB algorithm, a tintless algorithm 214 and an AF algorithm 216 within 3 A adjustment circuit 145, described below in detail.

Figure 13:
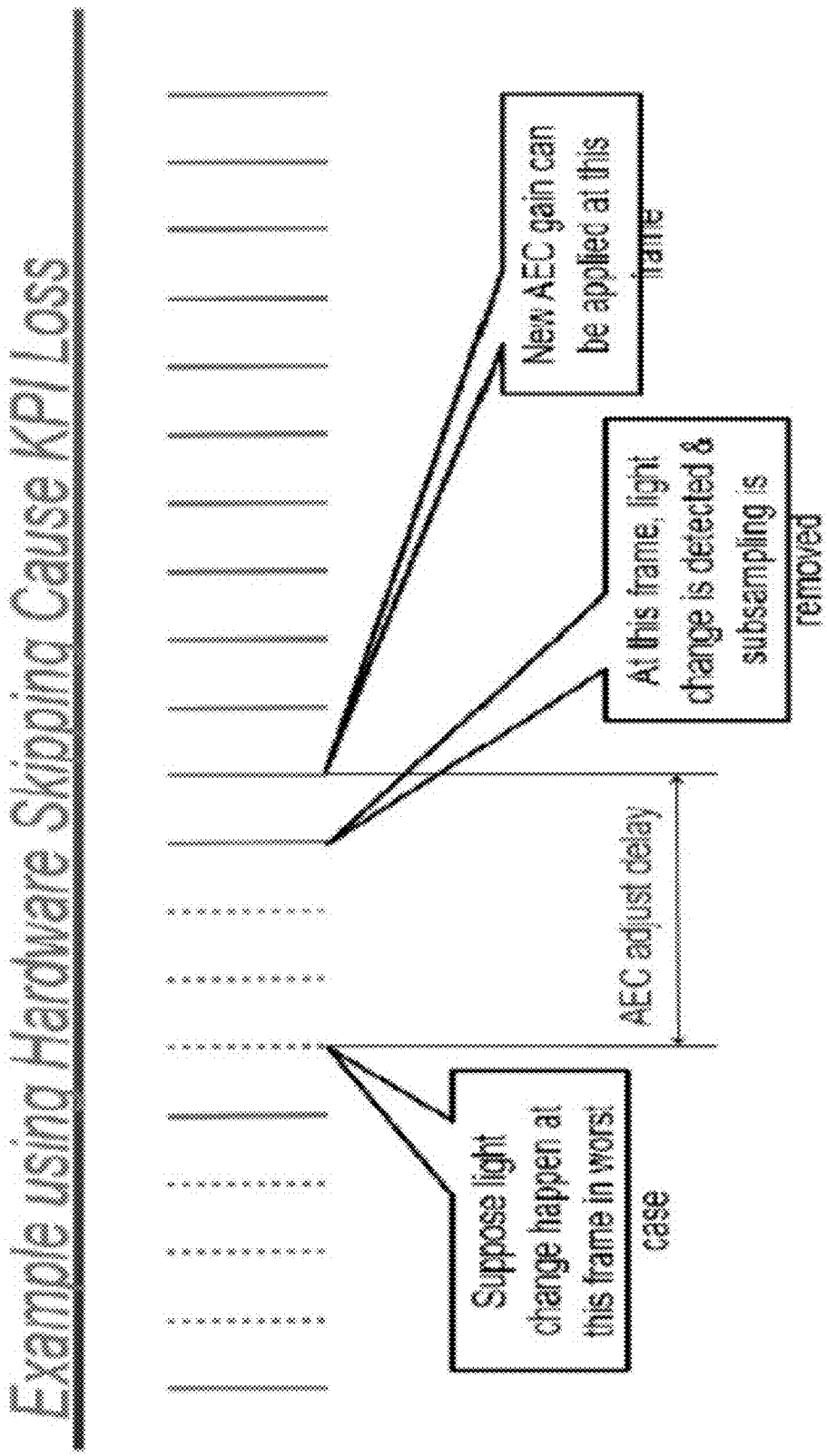
FIG. 13 is a schematic diagram of illustrating an example of applying sub-sampling raw statistics message that may be utilized in order to reduce power consumption, according to an example of the present disclosure described in this disclosure.

FIG. 13 is a schematic diagram illustrating an example of applying sub-sampling raw statistics message that may be utilized in order to reduce power consumption, according to an example of the present disclosure. According to one example, sub-sampling of raw statistics messages may be applied from 30 Hz to 7.5 Hz in the imaging device 110 to reduce the work load of 3 A modules and processor 120. In certain instances, if light change occurs between two sub-sampling moments, the imaging parameters adjustment may be delayed for up to 4 frames, which is not desirable. Therefore, according to one example, if hardware-based subsampling is applied to reduced power consumption, the sub-sampling rate may not be greater than 4. In one example, the frequency of raw statistics message may be maintained from imaging device as 30 Hz, while adaptively detecting a dynamic scene based on raw statistics messages.

Figure 7:
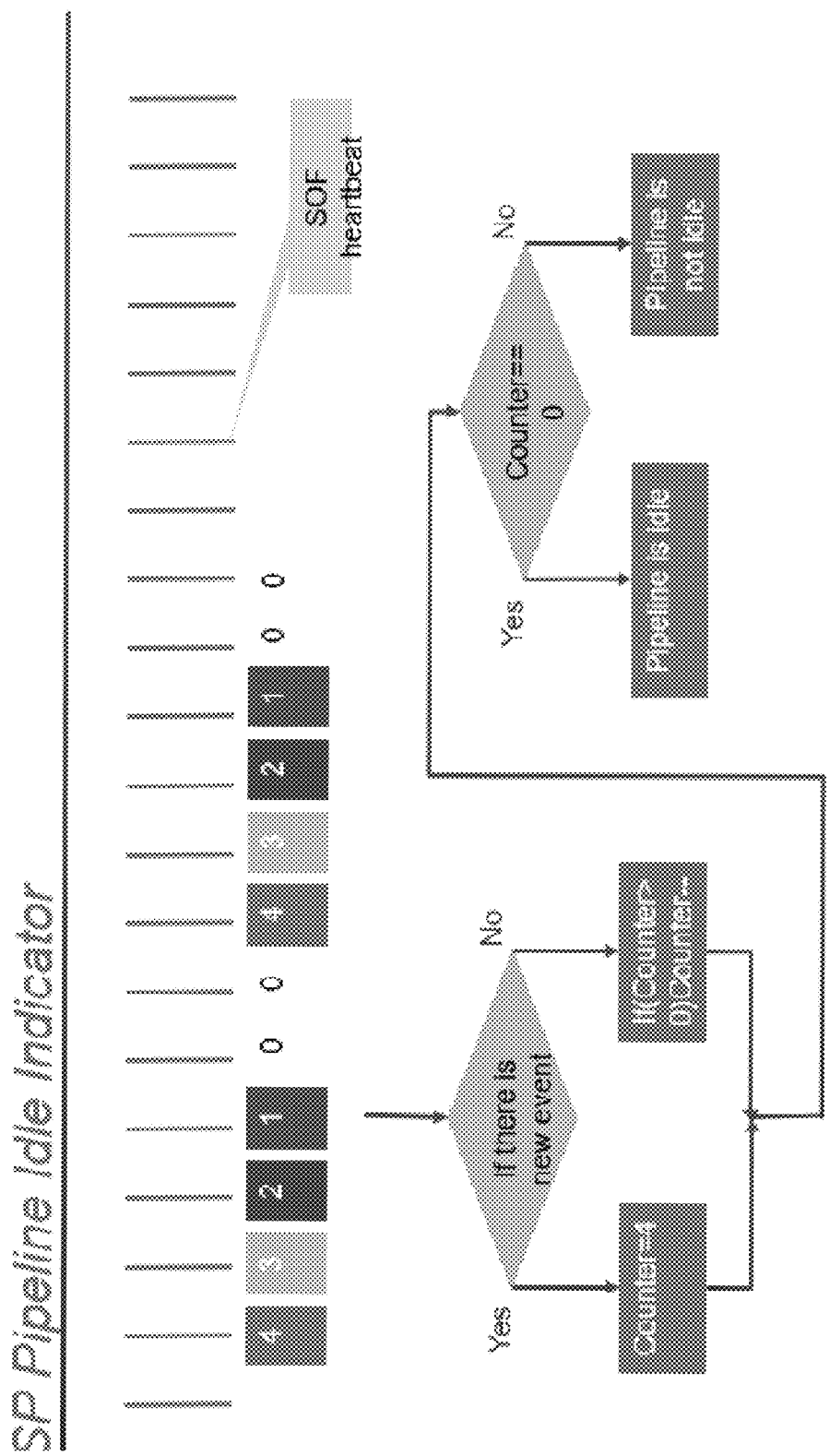
FIG. 7 is a schematic diagram of a pipeline idle indicator for transitioning between a static scene mode and a dynamic scene mode, according to an example of the present disclosure described in this disclosure.

During a scene change or light condition changes when in dynamic scene mode 202, the modules 150-160 within 3 A adjustment circuit 145 are activated to adjust ISP parameters as quickly as possible. Sensor gain is utilized for all other modules. Therefore, once sensor gain is adjusted, R/G/B gains or others parameters need to be re-adjusted. In dynamic scene mode 202, the input message to modules within 3 A adjustment circuit 145 are always 30 Hz, and the adjustment delay for 3 A adjustment circuit 145 parameters may be 1.3 ms. The input messages may be raw statistics to describe the R/G/B values in Bayer patterns in each frame, and may be used by the 3 A module to calculate image parameters such as sensor gain, R/G/B gains, and so forth. FIG. 6 is a schematic diagram of a pipeline to update image parameters per frame that may be utilized in order to reduce adjustment delay and enhance a user experience in fast changing light conditions during transitioning between a static scene mode and a dynamic scene mode, according to an example of the present disclosure. FIG. 7 is a schematic diagram of a pipeline idle indicator for skipping a per frames image parameter update to reduce power consumption when in a static scene mode that may be utilized during transitioning between a static scene mode and a dynamic scene mode, according to an example of the present disclosure.

Figure 4:
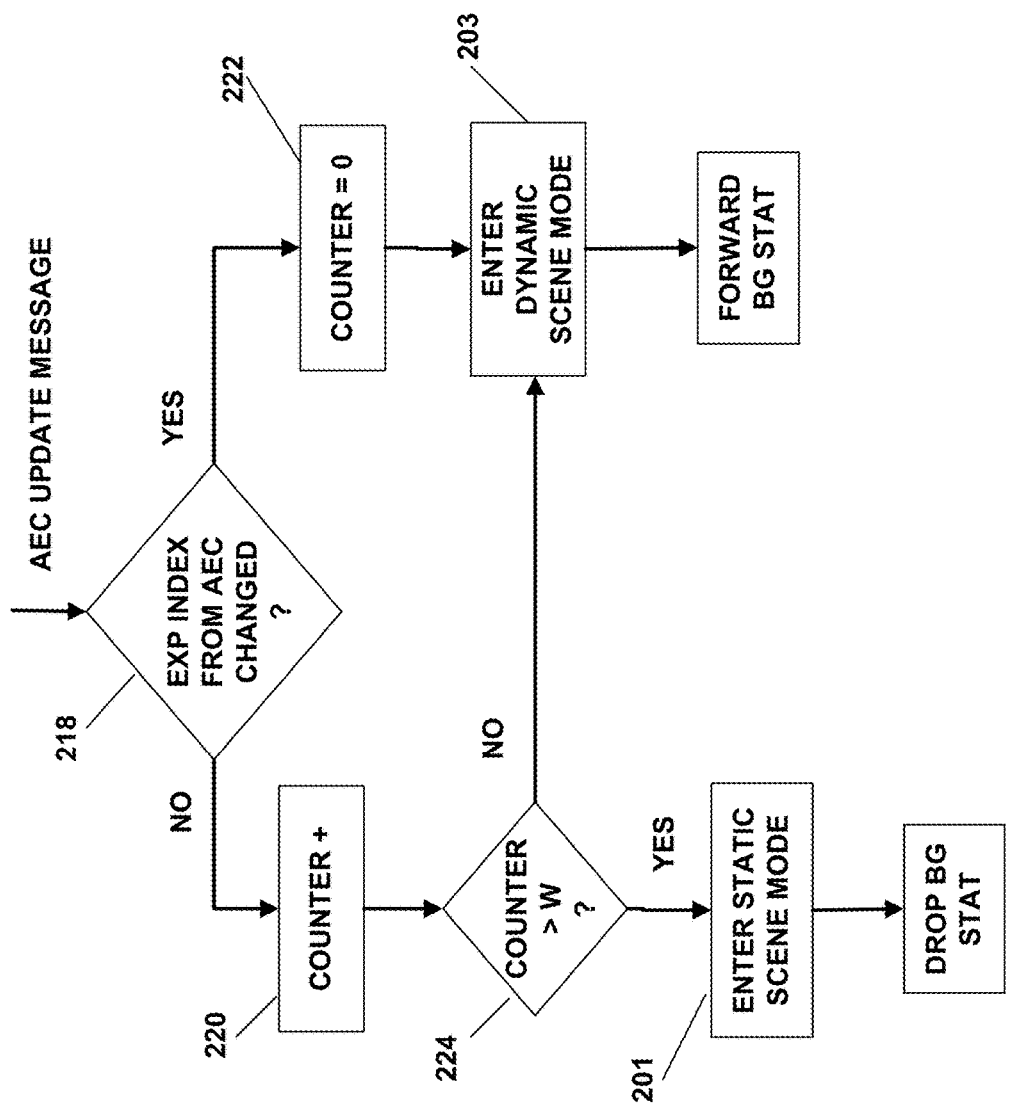
FIG. 4 is a flowchart of a method for transitioning between a static scene mode and a dynamic scene mode, according to an example of the present disclosure described in this disclosure.

FIG. 4 is a flowchart of static scene detection based on a stable exposure index, according to an example of the present disclosure. As illustrated in FIG. 4, according to one example of the present disclosure, in order to detect static scene mode 200 when the system is operating in dynamic scene mode 202, during which all of modules 150-160 in 3 A adjustment circuit 145 are operating, the stored output from modules 150-160 in 3 A adjustment circuit 145 are monitored, and if the outputs are determined to be stable over a pre-determined duration, the device determines that the system may transition from the dynamic scene mode 202 to the static scene mode 200. In one example, an output of an auto exposure control (AEC) is an exposure table index (EI), and therefore an EI of a current frame is compared to an EI of a previous frame to determine whether there is a change in the exposure index, Block 218. If the EI of the current frame is the same as or approximately equal to the EI of the previous frame, a counter is increased by 1, Block 220. On the other hand, if the EI of the current frame is not the same the counter is cleared to 0, Block 222, and the device remains in the dynamic scene mode 202, Block 203. Once the counter is greater than a threshold waiting frame number WF (e.g. 5, as illustrated in FIG. 13), Block 224, the system is determined to transition from the dynamic scene mode to the static scene mode 200, Block 201. The threshold WF may be applied in order to make sure all other modules in 3 A adjustment circuit 145 also finished their respective adjustment.

In another example, in order to detect dynamic scene mode 202 when the system is static scene mode 200, during which all of modules 150-160 in 3 A adjustment circuit 145 are paused or sub-sampled, other information is utilized to determine whether a dramatic scene change occurs. Raw statistics messages from ISP hardware contain frame information from imaging device 110 in a Bayer domain, i.e., using a Bayer grid. In one example, the raw statistics message are utilized to determine if a current scene change has occurred. Other methods are also possible to be used to determine a transition from the static scene mode 200 back to the dynamic scene mode 202. For example, the location information or sensed motion from motion sensors inside the smartphone may be used to determine whether the camera is moving.

Figure 5:
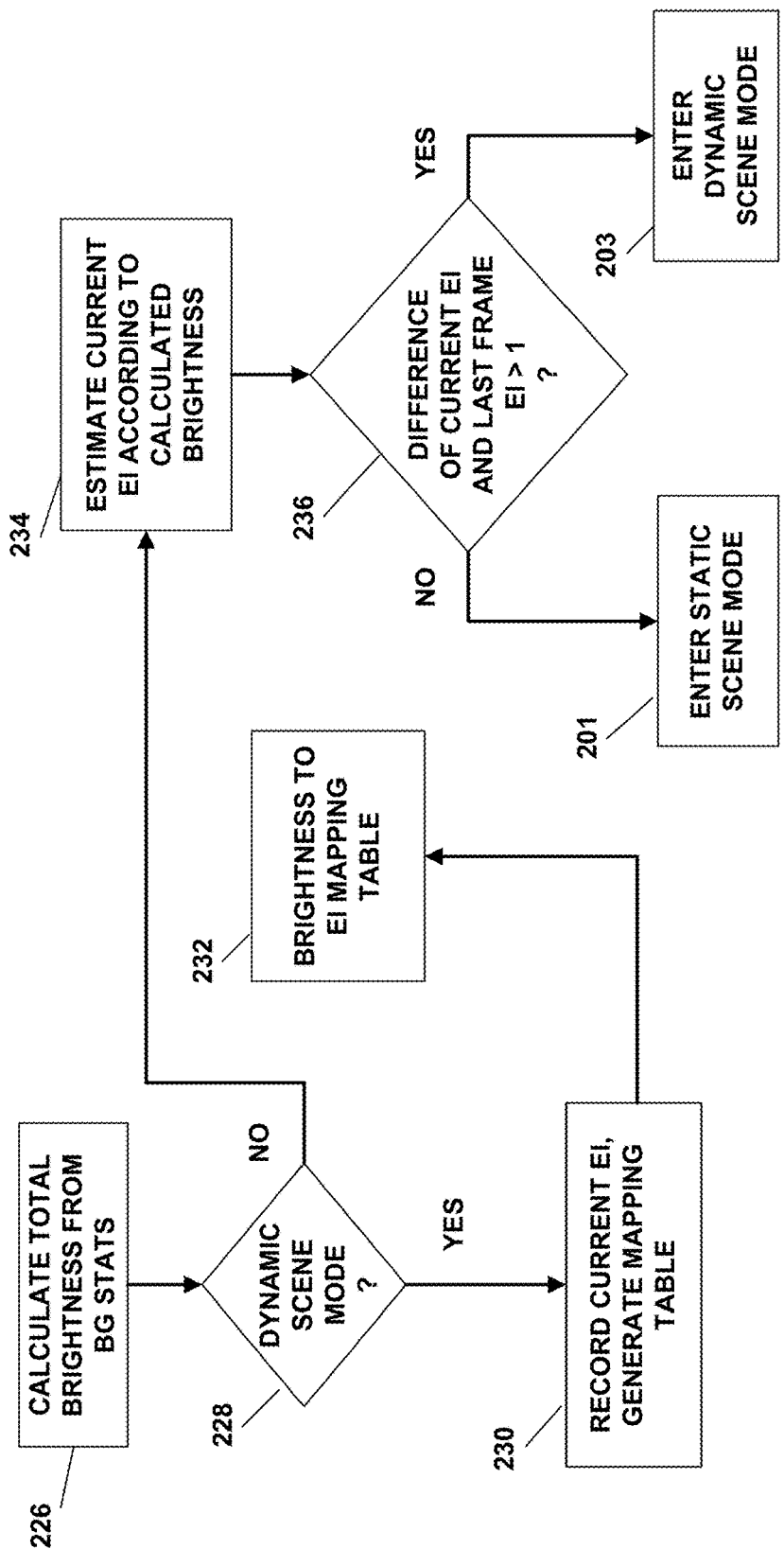
FIG. 5 is a flowchart of a method for transitioning between a static scene mode and a dynamic scene mode, according to an example of the present disclosure described in this disclosure.

FIG. 5 is a flowchart of a method for transitioning between a static scene mode and a dynamic scene mode based on changes in brightness, according to an example of the present disclosure. In one example, dynamic scene mode 202 may be detected based on total brightness or exposure table index estimation. For example, when in dynamic scene mode 202, the image capture device system 100 may calculate a total brightness from raw statistics, Block 226, based on the following formula:

$$\text{Total\_brightness} = (0.299*R + 0.587*G + 0.114*B)$$

where R/G/B is the averaged red, green, and blue channel intensity in the raw statistics message for all the regions.

The current Exposure index (EI) from an AEC algorithm of the AEC module 150 at the corresponding total_brightness may be recorded in memory 135, Block 230, with each EI having a corresponding Total_brightness. In another example, a mapping table from the Total_brightness to the EI may be generated, Block 220/222 when in the dynamic scene mode 202.

In another example, when in the static scene mode 200, NO in Block 228, a total_brightness may be calculated from the raw statistics message and the EI may be estimated from the mapping table according to the value of total_brightness, Block 234. As a result, running the AEC algorithm is avoided, resulting in reduced power consumption. The difference of current frame's EI from last frame's EI is compared, and if the difference comparison is less than a predetermined threshold, NO in Block 236, then it is determined that the current scene is still in static scene mode 200, Block 201. If the difference comparison is greater than the threshold, YES in Block 236, then image device system 100 transitions from the static scene mode 200 to the dynamic scene mode 202, Block 203. As a result, the EI may be estimated from a simple brightness calculation without executing the AEC module 150 procedure, which will save the power consumed by the AEC module 150.

The threshold may be configurable and corresponds to the sensitivity of the image capture device 100 with respect to system sensitivity to light change. If the threshold is small, the system may be more sensitive to the light change or scene content change. If the threshold is large, the system may be less sensitive, and therefore may remain in the static scene mode 200 and does not respond to marginal change of light or scene content. This threshold may be useful for the user experience and effects of power saving. A suitable choice for the threshold parameter to be utilized is made in order to achieve a desired tradeoff between adjustment performance and power efficiency.

According to one example, a difference between raw statistics information is utilized to determine whether image device system 100 is to transition from the static scene mode 200 back to the dynamic scene mode 202. The difference of a corresponding R/G/B channel intensity in corresponding regions between a current frame and a previous frame is determined, and a difference image is generated. If all the values in the difference image are determined to be larger than a threshold, the image device system 100 determines that the light is changing significantly and therefore transitions to the dynamic scene mode 200. If some values in the difference image are less than the threshold, indicating that the light is not changing to a large degree but the content of the scene is changing, a percentage of changing regions is determined. If the determined percentages of changing regions is larger than a changing regions threshold (e.g., 50%), then it is determined that image device system 100 should transition from the static scene mode 200 back to the dynamic scene mode 202. If the determined percentages of changing regions is not larger than the percentage of changing regions, the image device system 100 remains in the static scene mode 200.

In another example, during low light conditions, the image device system 100 may determine whether the device system 100 may be in the dynamic scene mode 202 using a relative correlation coefficients calculation, as illustrated in FIG. 14 for example. In order to calculate the normalized coefficients, the differences of corresponding regions of a current frame and a previous frame are normalized by the total energy of those differences. The normalization makes the correlation coefficients to be sensitive in low light conditions. The calculated correlation coefficients may be compared with another threshold ranging from 0 to 1. If the coefficient is larger than the threshold, the capture device system 100 may transfer to dynamic scene mode 202 from the static scene mode 200. If the coefficient is not larger than the threshold, the capture device system 100 may remain in the static scene mode 200.

Figure 9:
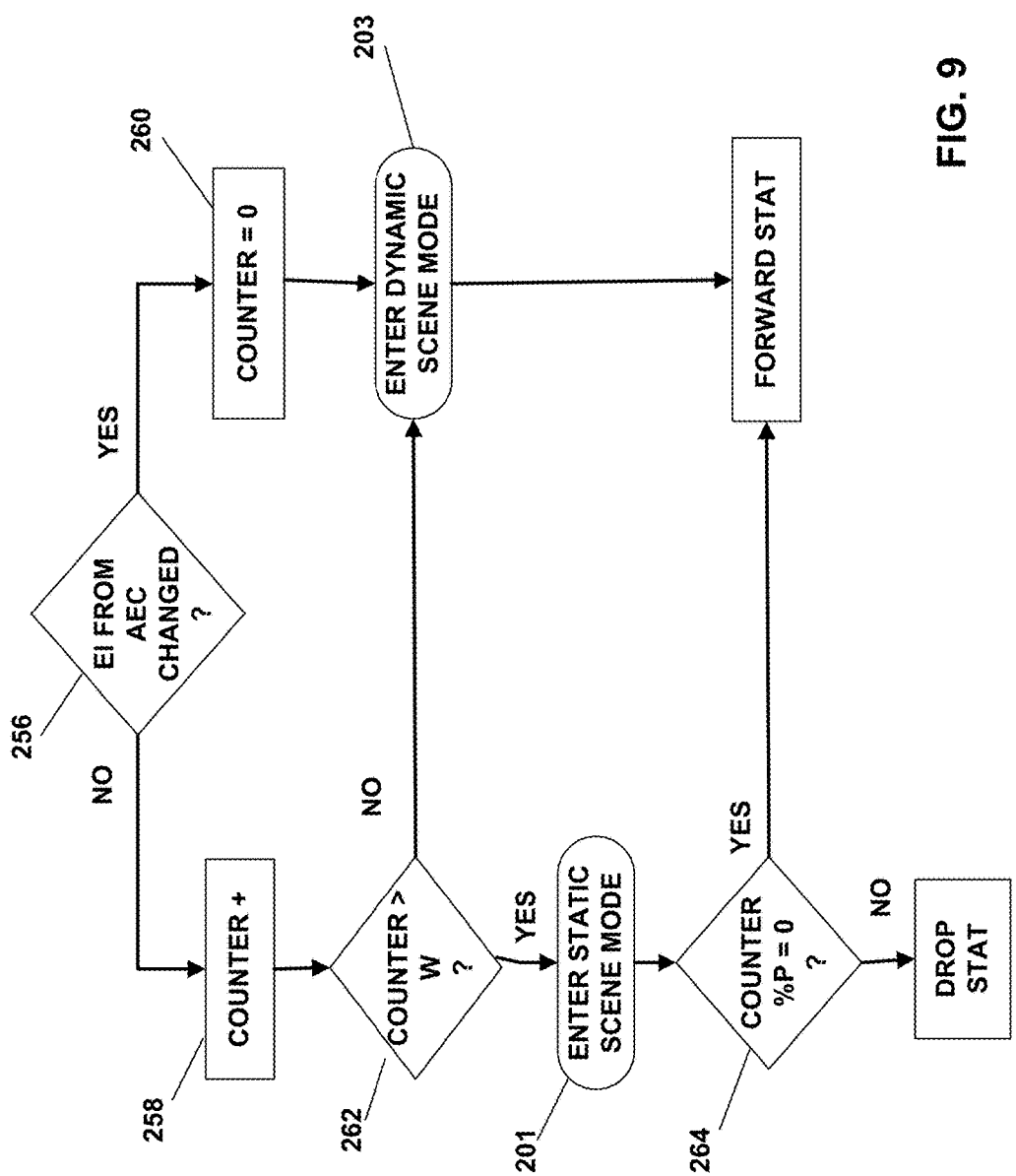
FIG. 9 is a flowchart of a method for transitioning between a static scene mode and a dynamic scene mode, according to an example of the present disclosure described in this disclosure.
Figure 10:
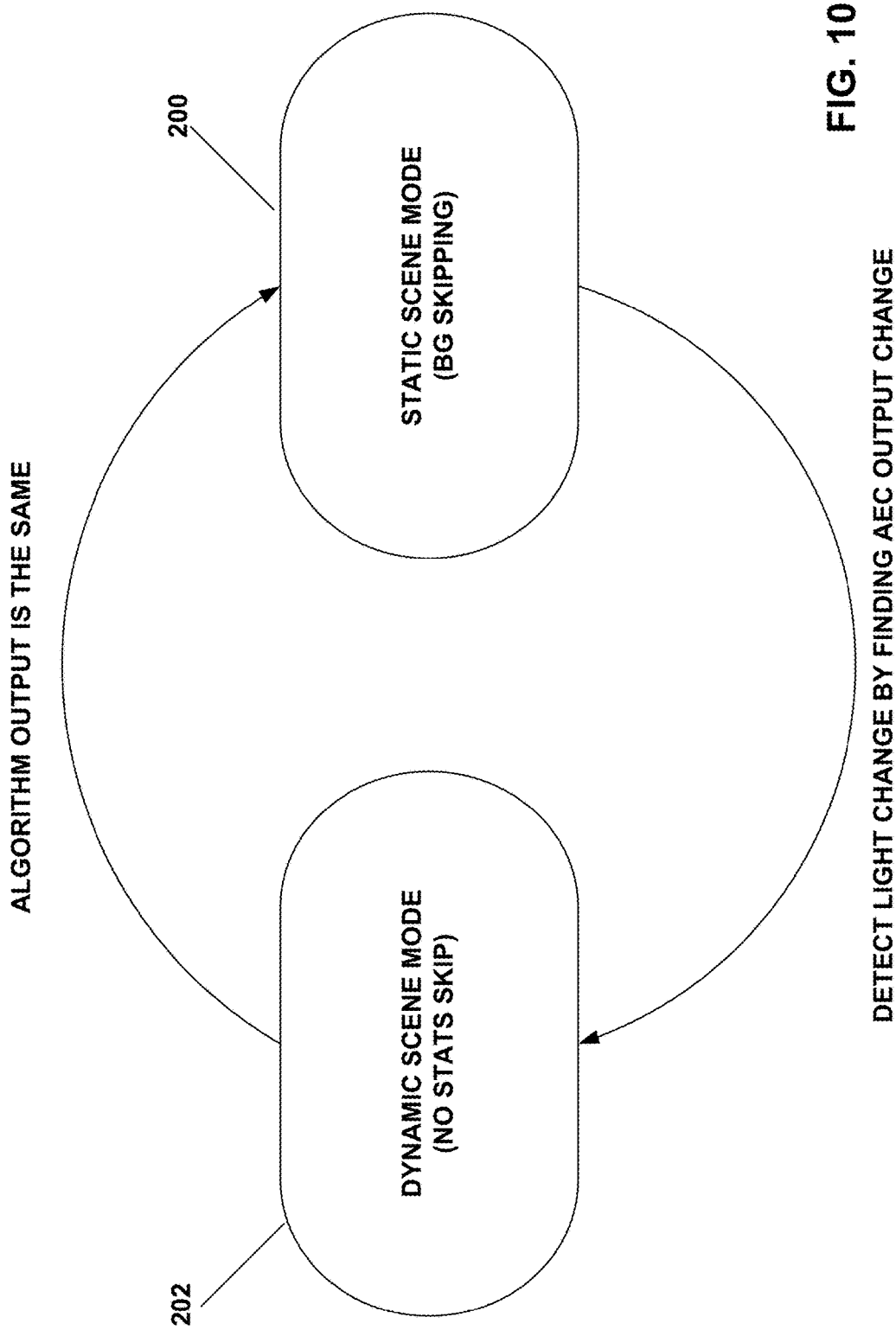
FIG. 10 is a schematic diagram of transitioning between a static scene mode and a dynamic scene mode, according to an example of the present disclosure.
Figure 12:
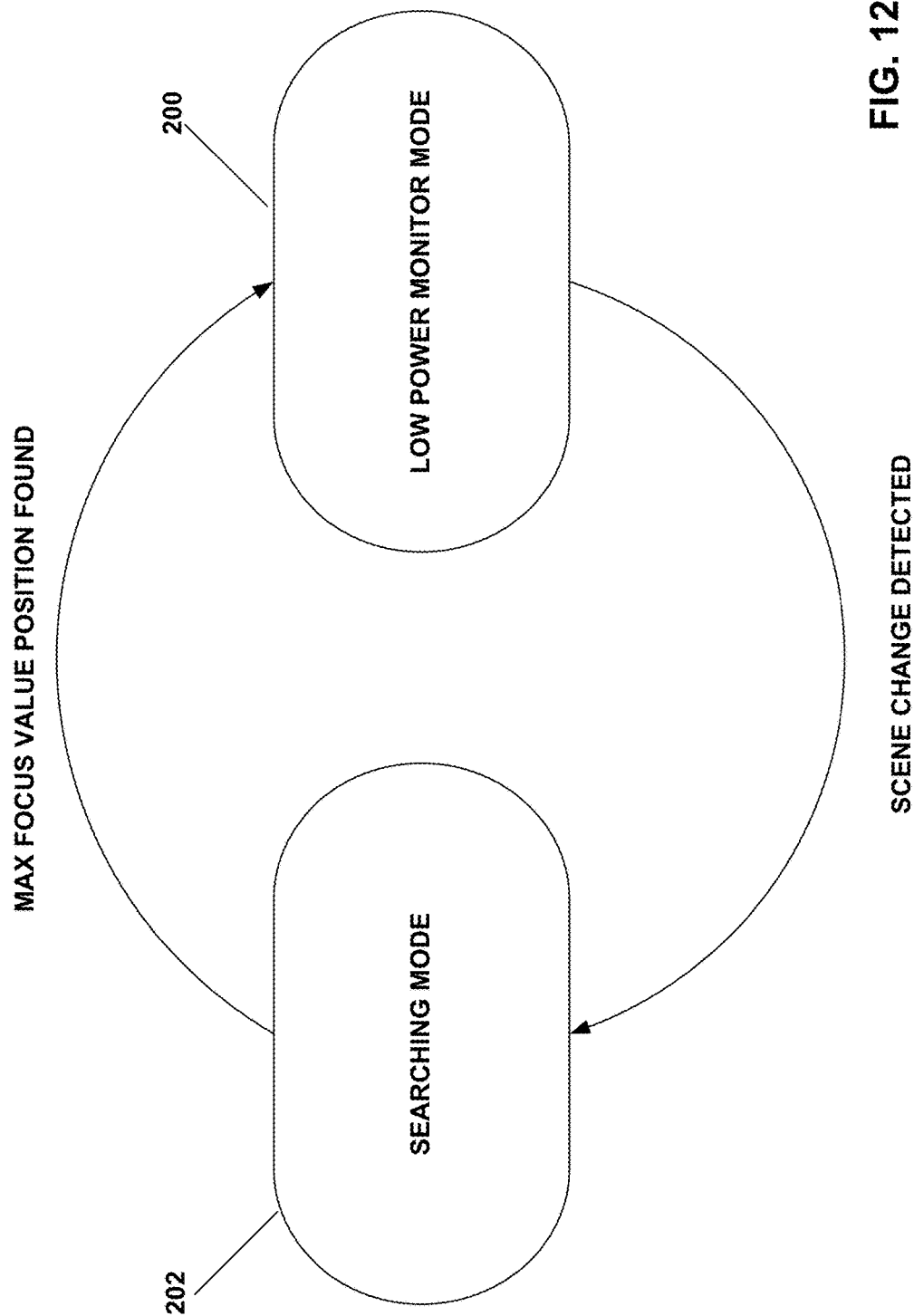
FIG. 12 is a schematic diagram of an autofocus feature during transitioning between a static scene mode and a dynamic scene mode, according to an example of the present disclosure.

FIG. 9 is a flowchart of a method for transitioning between a static scene mode and a dynamic scene mode, according to an example of the present disclosure. According to another example of the present disclosure, control of the transition between static mode and dynamic mode may be controlled based on the AEC module 150. For example, the AEC module 150 may be processed before all others modules in 3 A adjustment circuit 145. An example of control logic of this example is illustrated in FIG. 10 and state transition diagram is illustrated in FIG. 12. Similar to the method described in FIG. 4, in the example illustrated in FIG. 9, the static scene determination may include monitoring the output EI from AEC module 150, and comparing an EI of a current frame to an EI of a previous frame to determine whether there is a change in the exposure index, Block 256. If the EI of the current frame is not the same, the counter is cleared to 0, Block 260, and the device remains in the dynamic scene mode 202, Block 203. If the EI of the current frame is the same as or approximately equal to the EI of the previous frame, a counter is increased by 1, Block 258, and if the output EI is not stable for a given waiting frame number WF, such as 5 for example, Block 262, the device is determined to be in the dynamic scene mode, Block 203. On the other hand, if the output EI is stable for the given waiting frame number WF, Block 262, the device is determined to be in the static scene mode, Block 201.

When the system is in the static scene mode 200, all the modules in 3 A adjustment circuit 145, except for the AEC module 150, may be paused or sub-sampled so that the AEC module 150 operates while the device is in static scene mode 200. Although the AEC module 150 consumes some power, it may apply sophisticated algorithms to determine a suitable EI based on raw statistics message of current frame. If the output EI of the current frame is different from previous frame, Block 256, the image capture system 100 is determined to be in the dynamic scene mode 202, Block 203. When in the static scene mode 200, Block 201, a percentage of changing regions is determined, and if the determined percentages of changing regions is larger than a changing regions threshold (e.g., 50%), Block 264, then it is determined that image device system 100 should transition from the static scene mode 200 back to the dynamic scene mode 202. If the determined percentages of changing regions is not larger than the percentage of changing regions, the image device system 100 remains in the static scene mode 200.

Scene change detection is a function of AEC module 150, and may be employed for low power design for image capture device 100. FIG. 11 is a table of control parameters that may be implemented in this described technique for transitioning between a static scene mode and a dynamic scene mode.

Auto focus module 160 may use similar schemes to save power in imaging devices. As illustrated in FIG. 12, according to one example, auto focus module 160 may operate in two modes: searching mode and low power monitor mode. In the searching mode, auto focus module may allow an actuator in sensor 117 to adjust a lens position to achieve a desired image contrast. Once the lens position is fixed for a duration, auto focus module 160 may transition from the searching mode to the low power monitor mode. In the power monitor mode, auto focus module may use previous described methods to detect a scene change. Other methods may also be applied, such as motion detection based on motion sensor, depth map change, or phase information from sensor 117. Once it is determined the scene is changed, auto focus module 160 may transition the device from the low power monitor mode to the searching mode.

Figure 8:
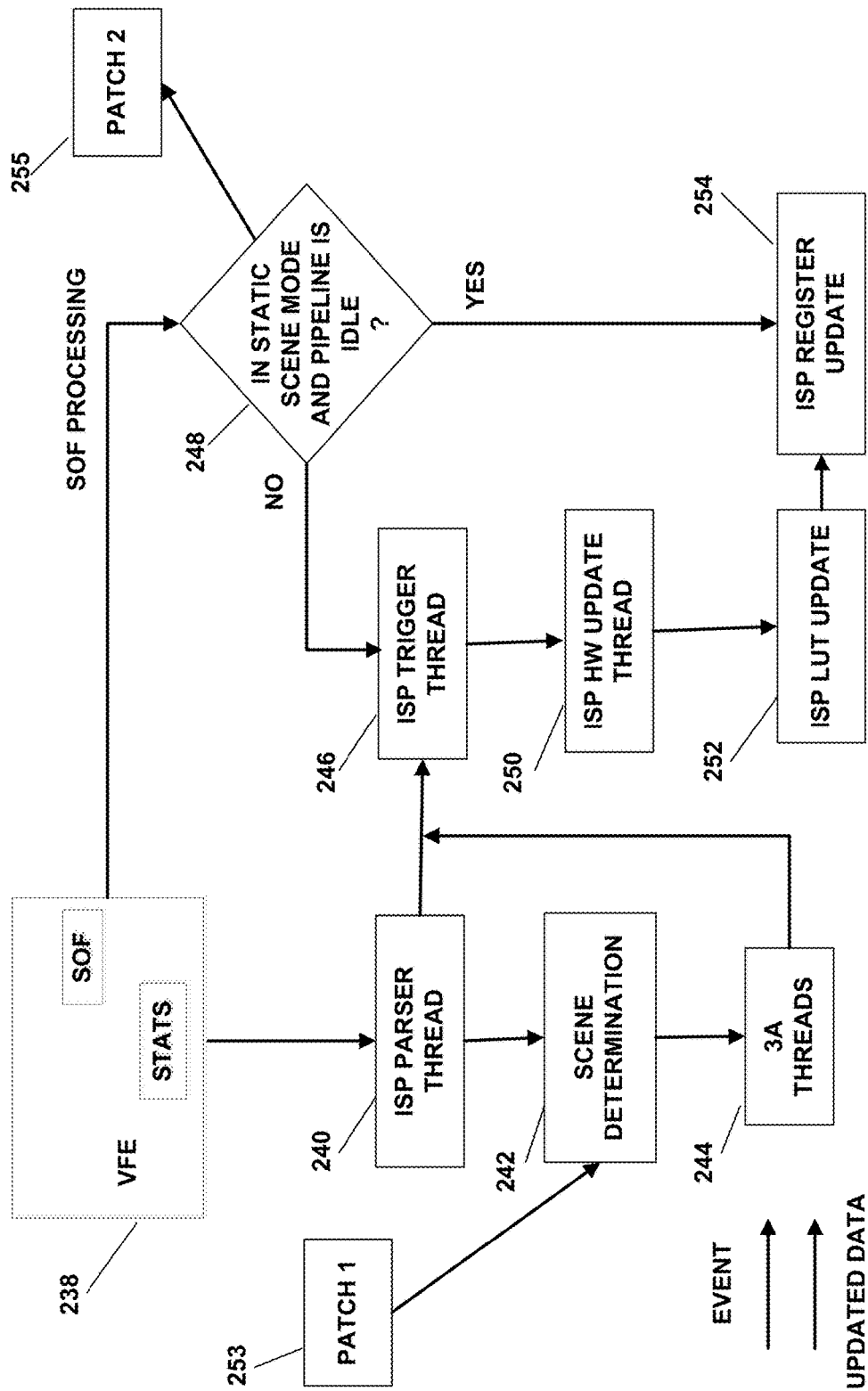
FIG. 8 is a flowchart of a method for transitioning between a static scene mode and a dynamic scene mode, according to an example of the present disclosure described in this disclosure.

In another example, as illustrated in FIGS. 7 and 8, 3 A adjustment circuit 145 employing a pipeline technique as illustrated in FIG. 6, for example, may be enhanced to reduce the power consumption. For example, a pipeline idle indicator may be applied to skip any unnecessary instructions executed in the processor 120. If there are no messages that are received from user interface module 170, or from other interfaces, transmitted to imaging device 110, the pipeline is marked as not idle, and the normal adjustment may be performed. If there are no messages from 3 A adjustment circuit 145 to imaging devices 110, the pipeline may be indicated as being idle, and any hardware relative parameters update procedure (i.e. imaging device trigger update, imaging device Lookup Table (LUT) update) may be skipped. The pipeline idle indicator may be combined with previous described methods to further save power when in the static scene mode 200. When system is in static scene mode 200, the imaging parameter update pipeline is idle in most cases except during some user interface messages from user interface module 170. When the system is in the dynamic scene mode 202, the pipeline may be always busy, and the update procedures may be performed to meet minimal adjustment delay requirement.

FIG. 8 is a flowchart of a method for skipping a per frame image parameters update that may be utilized during transitioning between a static scene mode and a dynamic scene mode, according to an example of the present disclosure. As illustrated in FIG. 8, imaging device hardware 238 generates a STATS message from sensor input, that is parsed by a parser software framework 240 into a software format to generate imaging parameters that are used in dynamic/static scene determination 242 to generate 3 A threads 244, as described in FIG. 3. Imaging device hardware also generates a start of frame (SOF) trigger for triggering updates procedures and determines whether the system is in the static scene mode during which the pipeline is typically idle, Block 248. If the system is determined to be in the static scene mode, no updating of all imaging parameters occurs Block 254. On the other hand, if the system is not in the static scene mode and therefore the pipeline is not idle, all imaging parameters are updated back into hardware 250 via ISP trigger thread 246, and updating of the lookup table is performed 252, as described above. According to one example, patches 253 and 255 may be included to enable software updates for the device. By the utilizing the power saving techniques of the present disclosure to skip 3 A adjustment, the proposed scheme of the present disclosure may save 27~28 mW CPU power and about 11~12 mA battery power when the image capture device operates in the static scene mode. With both 3 A adjustment and hardware update skipping, the power saving technique may save 35~37 mW CPU power and 18~20 mA battery power when the image capture device operates in the static scene mode. FIG. 10 is a schematic diagram of a state machine to control BG Stats DFS. In addition, the power saving technique of the present disclosure may not result in a large power penalty when the image capture device operates in the static scene mode and does not cause AEC adjustment delay when light condition changes. The power saving technique of the present disclosure may save approximately 42 mW power in the CPU rail and approximately 25 mA in power when the image capture device operates in the static scene mode. The power saving technique of the present disclosure does not increase power in other situations and does not incur adjust delay for 3 A adjustment circuit 145 or other tintless algorithms.

Figure 16:
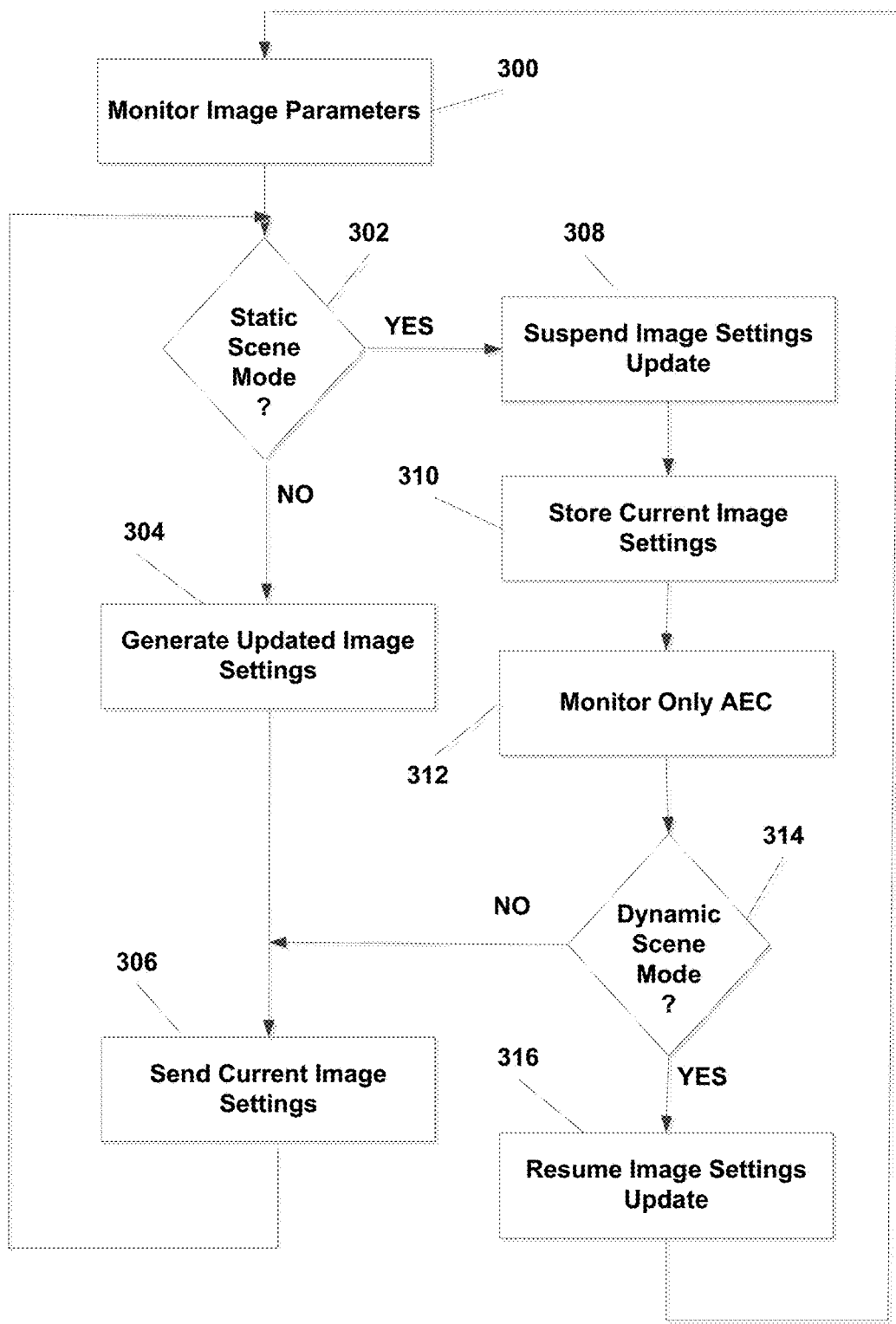
FIG. 16 is a flowchart of a method of implementing a power saving technique in an image capture device, according to an example of the present disclosure described in this disclosure.

FIG. 16 is a flowchart of a method of implementing a power saving technique in an image capture device, according to an example of the present disclosure. As illustrated in FIG. 16, according to one example, while in the dynamic scene mode 202 during which all of modules 150-160 are operating, adjustment circuit 145 of image capture device 100 monitors image capture parameters, Block 300, associated with modules 150-160, and based on the monitored image parameters determines whether the image capture device 100 should transition from the dynamic scene mode 202 to the static scene mode 200, Block 302. According to one example, an output of auto exposure control 150 is an exposure table index (EI), and therefore an EI of a current frame is compared to an EI of a previous frame. If the EI of the current frame is the same as or approximately equal to the EI of the previous frame, a counter is increased by 1. On the other hand, if the EI of the current frame is not the same the counter is cleared to 0. Once the counter is greater than a threshold waiting frame number WF (e.g. 5, as illustrated in FIG. 13), the system is determined to be in the static scene mode 200.

In this way, if it is determined in Block 302 that the image capture device 100 should not transition from the dynamic scene mode 202 to the static scene mode 200, i.e., the counter is less than or equal to the threshold WF, adjustment module 150 generates updated image settings, Block 304, and transmits the current updated image settings to the processor 120, Block 306. The updated image settings include instructions for configuring the processor 120 for performing image processing of the image capture device. Therefore, during operation in the dynamic scene mode 202, the configuration of the processor 120 continues to be adjusted based on the current updated image settings received from the adjustment module 150.

If it is determined in Block 302 that the image capture device 100 should transition from the dynamic scene mode 202 to the static scene mode 200, i.e., the counter is greater than the threshold WF, generation of the update images settings may be suspended, Block 308, and the most recent generated current image settings are stored, Block 310. According to one example, during suspending of the generation of image settings update while in the static scene mode 200, the auto white balance module 155 and the autofocus module 160 of the adjustment circuit 145 may be disabled or turned off, so that only the auto exposure control module 150 continues generating parameters. In another example, only the auto exposure control module 150 continues generating parameters but may do so at a reduced frequency, as described above.

In this way, in one example, while the static scene mode, the adjustment circuit 145 monitors only auto exposure control parameters, Block 312, and the image capture device 100 determines whether the image capture device 100 should transition from the static scene mode 200 back to the dynamic scene mode 202, Block 314. If it is determined that the image capture device 100 should not transition from the static scene mode 200 back to the dynamic scene mode 202 but rather remain in the static scene mode 200, the image capture device 100 sends the stored current image settings update to the processor 120, Block 306, and the process continues in the static scene mode 200 with the same stored updated image settings being utilized over and over by the processor 120 so that the instructions for configuring the processor 120 remain the same while the image capture device 100 is in the static scene mode 200. In this way, disabling or turning off the auto white balance module 155 and the autofocus module 160 of the adjustment circuit 145, so that only the auto exposure control module 150 continues generating parameters, and suspending updating of image settings and using the same updated image settings in the processor 120 results in a power savings for the image capture device 100 while in the static scene mode 200. In another example, having the auto exposure control module 150 continue generating parameters but at a reduced frequency, may result in further power savings for the image capture device 100.

If it is determined that the image capture device 100 should transition from the static scene mode 200 back to the dynamic scene mode 202, the image capture device 100 may turn all of modules 150-160 back on. In addition, adjustment circuit 145 no longer suspends image settings updates, Block 316, and resumes the process of monitoring of image capture parameters associated with modules 150-160 for the next frame, Block 300.

According to one example, in order to determine whether to transition from the static scene mode 200 back to the dynamic scene mode 202, Block 314, the image capture device 100 may determine whether the output exposure table index EI from the AEC module 150 for a current frame is different than the output exposure table index EI from a previous frame, as described above. If the output exposure table index EI from the AEC module 150 for a current frame is the same as the output exposure table index EI from a previous frame, the image capture device 100 may remain in the static scene mode 200. If the output exposure table index EI from the AEC module 150 for a current frame is different than the output exposure table index EI from a previous frame, the image capture device 100 may transition from the static scene mode 200 to the dynamic scene mode 202.

In this way, in one example of the present disclosure, an adjustment circuit of an image capture device may be configured to monitor image parameters, generate updated image settings for the image capture device based on the monitored image parameters, and transmit the updated image settings to one or more processors configured to receive the transmitted updated image settings from the adjustment circuit. The received updated image settings may include instructions for configuring the one or more processors to perform image processing of the image capture device. The received updated image settings may configure the one or more processors to: determine to transition the image capture device from a dynamic scene mode to a static scene mode based on a first image parameter included in the monitored image parameters that is different from a second image parameter that the one or more processors use to determine to transition the image capture device from the static scene mode to the dynamic scene mode, cause the adjustment circuit to suspend generation of all or less than all of the updated image settings in response to determining to transition the image capture device from the dynamic scene mode to the static scene mode, and transition the image capture device from the dynamic scene mode to the static scene mode.

In one example, the image parameters may include a first set of image parameters, and the monitored image parameters may include a first set of monitored image parameters, and subsequent to the transition of the image capture device from the dynamic scene mode to the static scene mode, the adjustment circuit is configured to monitor a second set of image parameters. Subsequent to the transition of the image capture device from the dynamic scene mode to the static scene mode, the one or more processors may be configured to: determine to transition the image capture device from the static scene mode to the dynamic scene mode based on the second image parameter included in the second set of image parameters, and transition the image capture device from the static scene mode to the dynamic scene mode.

In another example, the one or more processors may be configured to cause the adjustment circuit to restart generation of updated image settings in response to determining to transition the image capture device from the static scene mode to the dynamic scene mode, and receive and be configured by the updated image settings generated by the adjustment circuit subsequent to causing the adjustment circuit to restart generation of updated image settings.

In another example, the second image parameter may be an exposure index of a current frame, and wherein to determine whether to transition the image capture device from the static scene mode to the dynamic scene mode based on the second image parameter, the one or more processors may be configured to: compare the exposure index of the current frame to an exposure index of a previous frame, and determine to transition from the static scene mode to the dynamic scene mode in response to the exposure index of the current frame being approximately equal to the exposure index of the previous frame.

Figure 17:
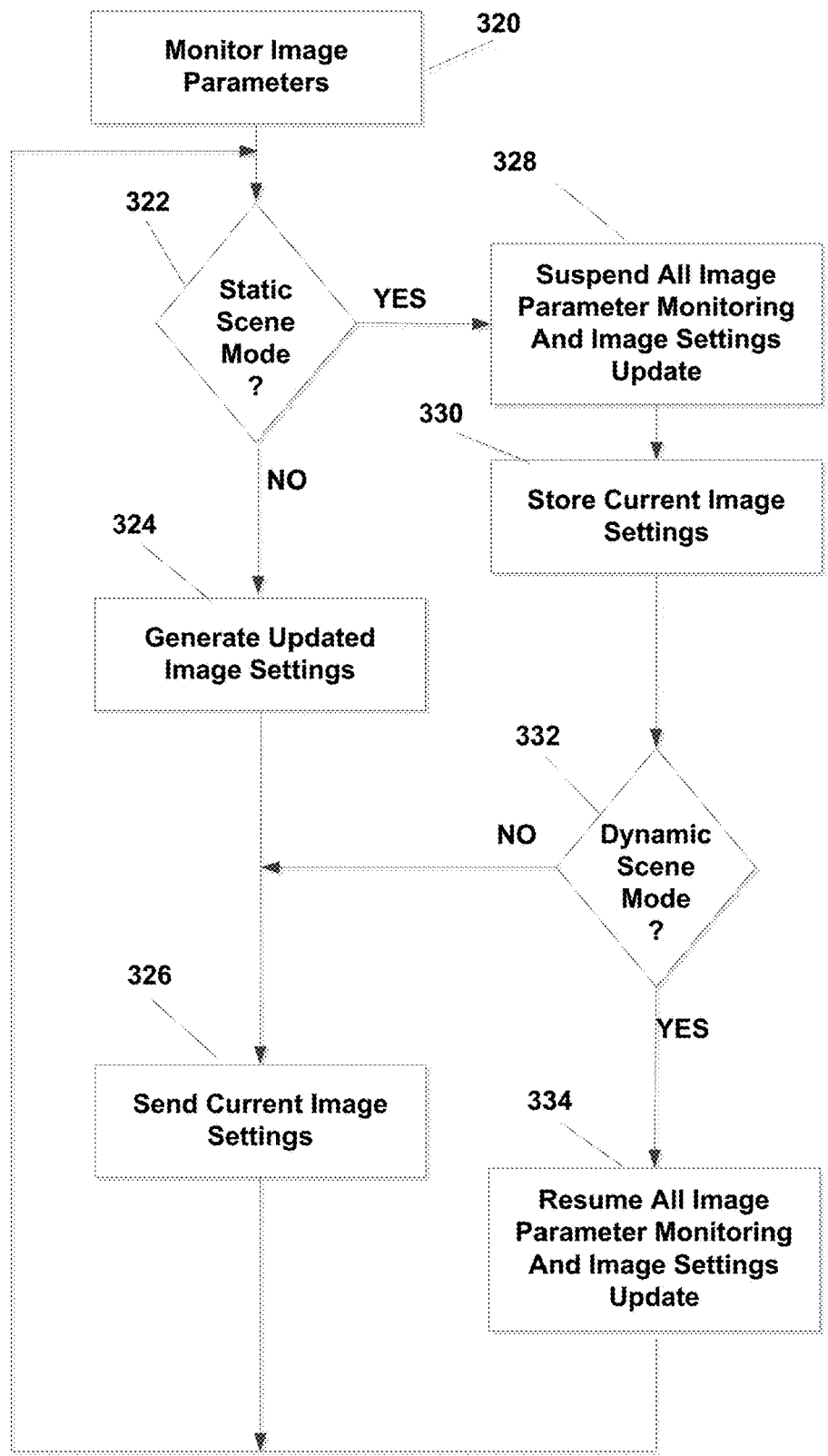
FIG. 17 is a flowchart of a method of implementing a power saving technique in an image capture device, according to an example of the present disclosure described in this disclosure.

FIG. 17 is a flowchart of a method of implementing a power saving technique in an image capture device, according to an example of the present disclosure. As illustrated in FIG. 17, according to one example, while in the dynamic scene mode 202 during which all of modules 150-160 are operating, adjustment circuit 145 of image capture device 100 monitors image capture parameters associated with modules 150-160, Block 320, and based on the monitored image parameters determines whether the image capture device 100 should transition from the dynamic scene mode 202 to the static scene mode 200, Block 322. According to one example, an output of auto exposure control 150 is an exposure table index (EI), and therefore an EI of a current frame is compared to an EI of a previous frame. If the EI of the current frame is the same as or approximately equal to the EI of the previous frame, a counter is increased by 1. On the other hand, if the EI of the current frame is not the same the counter is cleared to 0. Once the counter is greater than a threshold WF (e.g. 5, as illustrated in FIG. 13), the system is determined in Block 332 to be in the static scene mode 200.

In this way, if it is determined in Block 322 that the image capture device 100 should not transition from the dynamic scene mode 202 to the static scene mode 200, i.e., the counter is less than or equal to the threshold WF, adjustment module 150 generates updated image settings, Block 324, and transmits the current updated image settings to the processor 120, Block 326. The updated image settings include instructions for configuring the processor 120 for performing image processing of the image capture device. Therefore, during operation in the dynamic scene mode 202, the configuration of the processor 120 continues to be adjusted based on the current updated image settings received from the adjustment module 150.

If it is determined in Block 322 that the image capture device 100 should transition from the dynamic scene mode 202 to the static scene mode 200, i.e., the counter is greater than the threshold WF, all image parameter monitoring and the generation of the update images settings may be suspended, Block 328, and the most recent generated current image settings are stored, Block 320. According to one example, during suspending of image parameter monitoring and the generation of image settings update while in the static scene mode 200, each of the auto exposure control module 150, the auto white balance module 155 and the autofocus module 160 of the adjustment circuit 145 may be disabled or turned off, resulting on a power saving for the image capture device 100 while in the static scene mode 200.

While in the static scene mode, the image capture device determines whether the image capture device 100 should transition from the static scene mode 200 back to the dynamic scene mode 202, Block 332. If it is determined that the image capture device 100 should not transition from the static scene mode 200 back to the dynamic scene mode 202 but rather remain in the static scene mode 200, the image capture device 100 sends the stored current image settings update to the processor 120, Block 326, and the process continues in the static scene mode 200 using the same stored image settings update from Block 330 so that the instructions for configuring the processor 120 remain the same while the image capture device 100 is in the static scene mode 200. In this way, having the adjustment circuit disabled or turn off all of modules 150-160 and using the same updated image settings for configuring the processor 120 results in a power savings for the image capture device 100 while in the static scene mode 200.

If it is determined in Block 332 that the image capture device 100 should transition from the static scene mode 200 back to the dynamic scene mode 202, the image capture device 100 may turn all of modules 150-160 back on and adjustment circuit 145 resumes image settings updates and monitoring of image capture parameters associated with modules 150-160 for the next frame, Block 334.

According to one example, in order to determine whether to transition from the static scene mode 200 back to the dynamic scene mode 202 in Block 332 while all of modules 150-160 in 3 A adjustment circuit 145 are paused or disabled or turned off, or sub-sampled, other information is utilized to determine whether a dramatic scene change occurs. As described above, raw statistics messages from ISP hardware contain frame information from imaging device 110 in a Bayer domain, i.e., a Bayer grid. In one example, the raw statistics message may be utilized to determine if a current scene change has occurred, and therefore the image capture device 100 should transition from the static scene mode 200 back to the dynamic scene mode 202, as described above. Other methods are also possible to be used to determine a transition from the static scene mode 200 back to the dynamic scene mode 202. For example, the location information or sensed motion from motion sensors inside the image capture device 100 may be used to determine whether the image capture device 100 is moving.

In another example, determining whether to transition back to the dynamic scene mode 202 while the image capture device 100 is in the static scene mode 200 in Block 332 may be based on image parameters other than parameters from 3 A adjustment circuit 145, such as total brightness or exposure table index estimation, as described above. For example, a total brightness may have been previously determined during a time when the image capture device 100 was in the dynamic scene mode 202 using the total_brightness equation, as described above. In one example, total brightness may be calculated using statistics data from the raw statistics message and the exposure table index EI is estimated from the mapping table based on the value of total_brightness. As a result, running the AEC algorithm in the AEC module 150 is avoided. The difference of current frame's EI from last frame's EI is compared, and if the difference comparison is less than a predetermined threshold, then it is determined in Block 332 that the current scene is still in static scene mode 200. If the difference comparison is greater than the threshold, the dynamic scene mode is determined in Block 332 and therefore image capture device 100 may transition from the static scene mode 200 back to the dynamic scene mode 202. As a result, the EI may be estimated from a simple brightness calculation without having to execute an algorithm in the auto exposure control module 150, thereby enabling all of modules 150-160 to be suspended or disabled or turned off while the image capture device 100 is in the static scene mode, resulting in an increased power savings.

The threshold may be configurable and corresponds to the sensitivity of the image capture device 100 with respect to system sensitivity to light change. If the threshold is small, the system is more sensitive to the light change or scene content change. If the threshold is large, the system is less sensitive, and therefore may remain in the static scene mode 200 and does not respond to marginal change of light or scene content. This threshold is significant for the user experience and effects of power saving. A suitable choice for the threshold parameter to be utilized is made in order to achieve a desired tradeoff between adjustment performance and power efficiency.

According to one example, image parameters other than parameters from 3 A adjustment circuit 145, such as a difference between raw statistics information may be utilized to determine whether image capture device 100 should transition from the static scene mode 200 back to the dynamic scene mode 202 in Block 332. The difference of a corresponding R/G/B channel intensity in corresponding regions between a current frame and a previous frame is determined, and a difference image is generated. If all the values in the difference image are determined to be larger than a threshold, the image capture device 100 determines that the light is changing significantly and therefore determines in Block 332 that the image capture device 100 should transition from the static scene mode 200 back to the dynamic scene mode 200. In another example, if some values in the difference image are less than the threshold, indicating that the light is not changing to a large degree but the content of the scene is changing, a percentage of changing regions may be determined. If the determined percentages of changing regions is larger than a changing regions threshold (e.g., 50%), then it is determined in Block 332 that image capture device 100 should transition from the static scene mode 200 back to the dynamic scene mode 202. If the determined percentages of changing regions is not larger than the percentage of changing regions, it is determined in Block 332 that the image capture device 100 remains in the static scene mode 200.

In another example, during low light conditions, the image capture device 100 may determine whether the image capture device 100 is in the dynamic scene mode 202 using a relative correlation coefficients calculation, as illustrated in FIG. 14 for example. In order to calculate the normalized coefficients, the differences of corresponding regions of a current frame and a previous frame are normalized by the total energy of those differences. The normalization makes the correlation coefficients to be sensitive in low light conditions. The calculated correlation coefficients may be compared with another threshold ranging from 0 to 1. If the coefficient is larger than the threshold, the image capture device 100 may transition from the static scene mode 200 back to the dynamic scene mode 202, Yes in Block 332. If the coefficient is not larger than the threshold, the image capture device 100 may remain in the static scene mode 200, No in Block 332.

In this way, in one example of the present disclosure, an adjustment circuit of an image capture device may be configured to monitor image parameters, generate updated image settings for the image capture device based on the monitored image parameters, and transmit the updated image settings to one or more processors configured to receive the transmitted updated image settings from the adjustment circuit. The received updated image settings may include instructions for configuring the one or more processors to perform image processing of the image capture device. The received updated image settings may configure the one or more processors to: determine to transition the image capture device from a dynamic scene mode to a static scene mode based on a first image parameter included in the monitored image parameters that is different from a second image parameter that the one or more processors use to determine to transition the image capture device from the static scene mode to the dynamic scene mode, cause the adjustment circuit to suspend generation of all or less than all of the updated image settings in response to determining to transition the image capture device from the dynamic scene mode to the static scene mode, and transition the image capture device from the dynamic scene mode to the static scene mode.

In one example, the image parameters may include a first set of image parameters, and the monitored image parameters may include a first set of monitored image parameters, and subsequent to the transition of the image capture device from the dynamic scene mode to the static scene mode, the adjustment circuit is configured to monitor a second set of image parameters. Subsequent to the transition of the image capture device from the dynamic scene mode to the static scene mode, the one or more processors may be configured to: determine to transition the image capture device from the static scene mode to the dynamic scene mode based on the second image parameter included in the second set of image parameters, and transition the image capture device from the static scene mode to the dynamic scene mode.

In another example, the one or more processors may be configured to cause the adjustment circuit to restart generation of updated image settings in response to determining to transition the image capture device from the static scene mode to the dynamic scene mode, and receive and be configured by the updated image settings generated by the adjustment circuit subsequent to causing the adjustment circuit to restart generation of updated image settings.

In another example, the second image parameter may be R/G/B channel intensity, and wherein to determine to transition the image capture device from the static scene mode to the dynamic scene mode based on the second image parameter, the one or more processors may be configured to: determine, while in the static scene mode, a difference of the R/G/B channel intensity in corresponding regions between a current frame and a previous frame, generate a difference image based on the difference, compare values in the difference image to a difference range threshold, and determine to transition from the static scene mode to the dynamic scene mode based on to the comparing.

Figure 18:
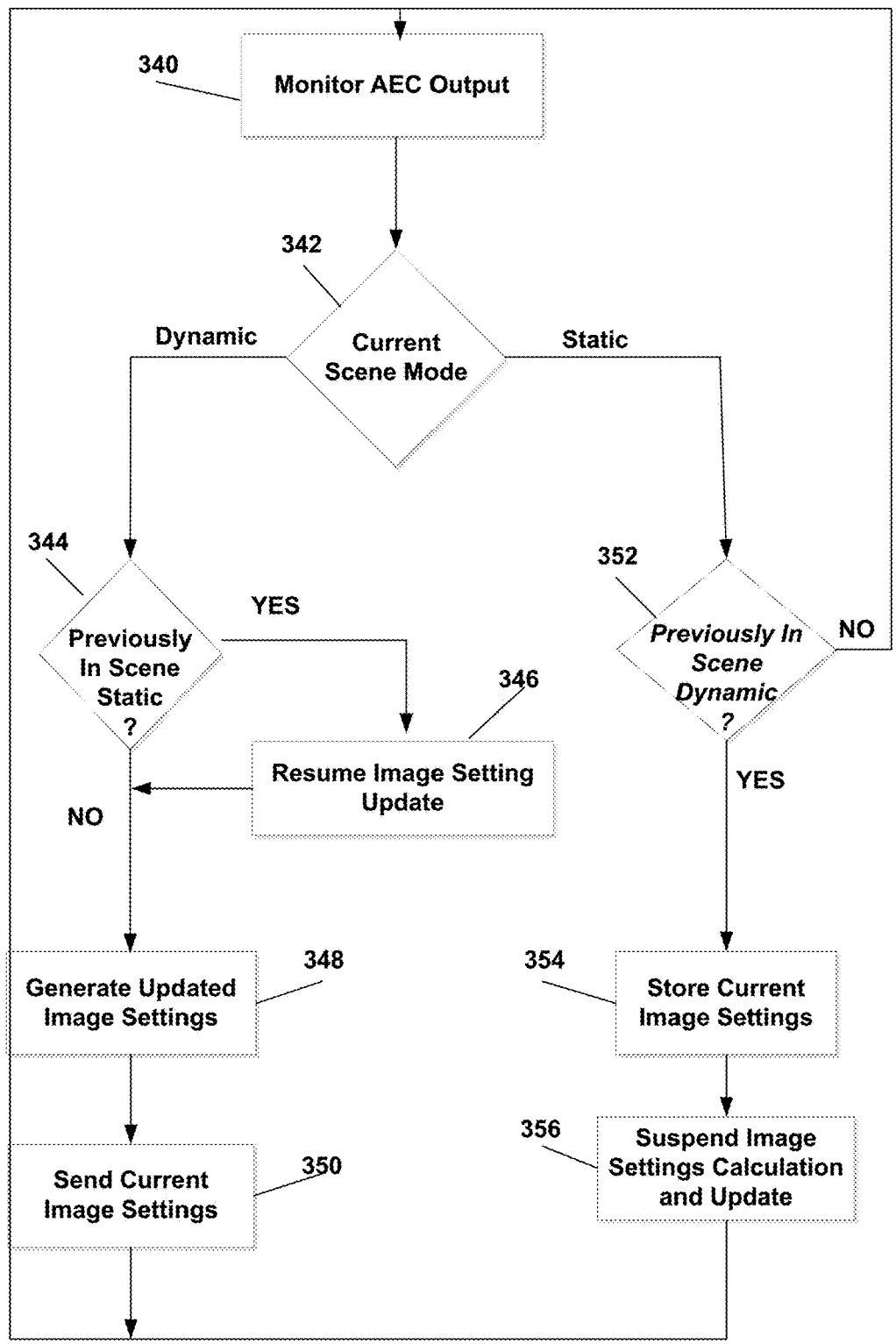
FIG. 18 is a flowchart of a method of implementing a power saving technique in an image capture device, according to an example of the present disclosure described in this disclosure.

FIG. 18 is a flowchart of a method of implementing a power saving technique in an image capture device, according to an example of the present disclosure described in this disclosure. As illustrated in FIG. 18, according to one example, image capture device 100 monitors the output from AEC module 150, Block 340, and if the current scene mode of the image capture device 100 is the dynamic scene mode 202, Block 342, a determination is made as to whether the image capture device 100 was in the static scene mode 200 during the previous frame, Block 344. If the image capture device 100 was previously in the static scene mode 200, Yes in Block 344, image capture device 100 resumes the process of monitoring of image capture parameters associated with modules 150-160, Block 346. Once the process of monitoring of image capture parameters associated with modules 150-160 is resumed, Block 346, or if the image capture device 100 was not previously in the static scene mode 200, No in Block 344, updated image settings are generated, Block 348, and image capture device 100 transmits the current updated image settings to the processor 120, Block 350, and the process is continued for the next frame.

If the current scene mode of the image capture device 100 is the static scene mode 200, Block 342, a determination is made as to whether the image capture device 100 was in the dynamic scene mode 200 during the previous frame, Block 352. If the image capture device 100 was previously in the dynamic scene mode 200, Yes in Block 344, image capture device 100 stores the current image capture parameters associated with modules 150-160, Block 354, and calculation and the updating of the image settings may be suspended, Block 356, and the process is continued for the next frame.

Figure 19:
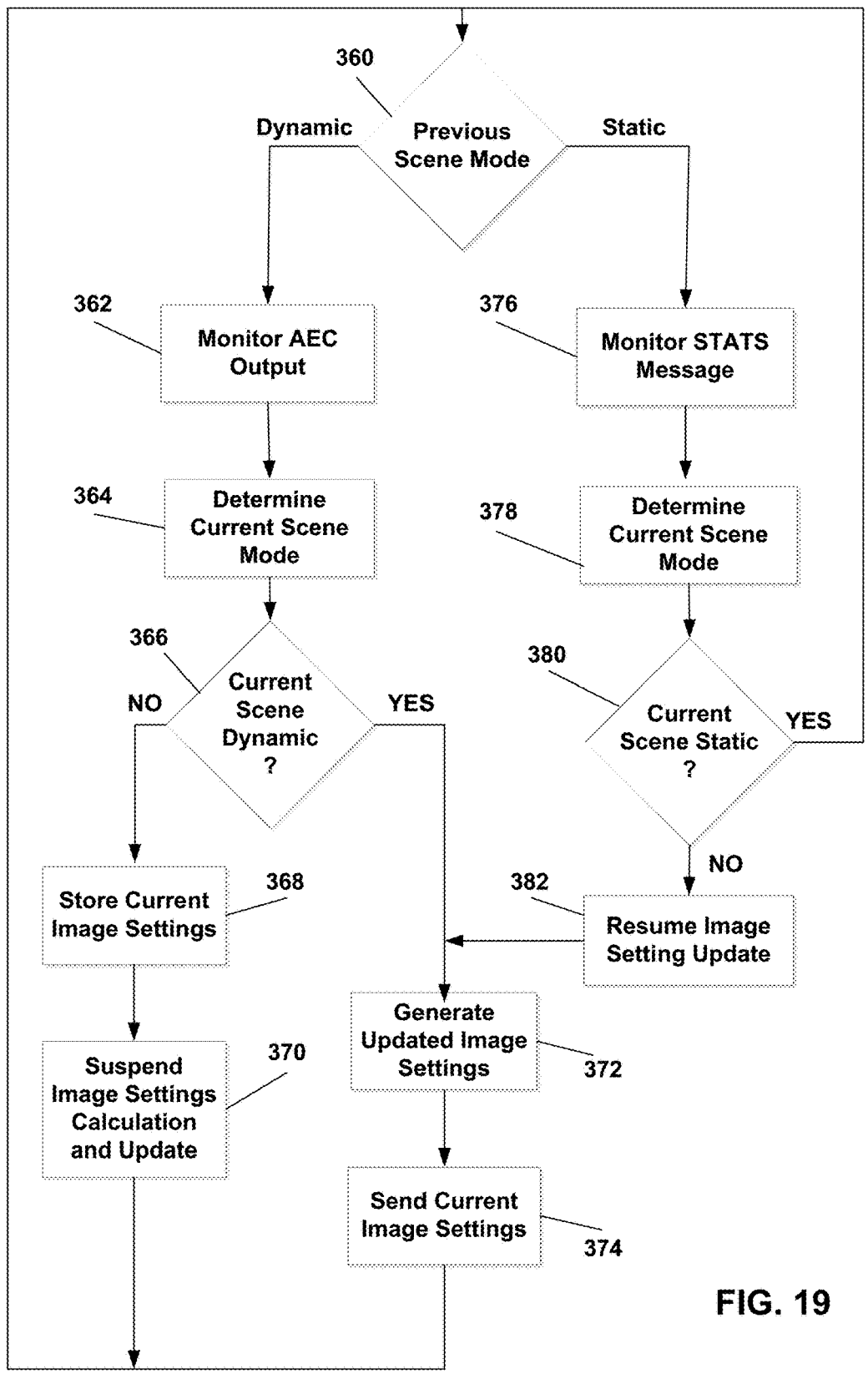
FIG. 19 is a flowchart of a method of implementing a power saving technique in an image capture device, according to an example of the present disclosure described in this disclosure.

FIG. 19 is a flowchart of a method of implementing a power saving technique in an image capture device, according to an example of the present disclosure described in this disclosure. As illustrated in FIG. 19, according to one example, during transitioning between the static scene mode 200 and the dynamic scene mode 202, if the image capture device 100 was in the dynamic scene mode 202 during the previous frame, Block 360, image capture device 100 monitors the output from AEC module 150, Block 362, and determines a current scene mode for the current frame, Block 364 based on the monitored AEC output, Block 362. If the current scene or frame is not determined to be the dynamic scene mode 202, No in Block 366, image capture device 100 stores the current image capture parameters associated with modules 150-160, Block 368, suspends calculation and updating of the image settings, Block 370, and the process is continued for the next frame. If the current scene or frame is determined to be the dynamic scene mode 202, Yes in Block 366, updated image settings are generated, Block 372, and image capture device 100 transmits the current updated image settings to the processor 120, Block 374, and the process is continued for the next frame.

If the image capture device 100 was in the static scene mode 200 during the previous frame, Block 360, image capture device 100 monitors the STATS message, as described above, Block 376, and determines a current scene mode for the current frame, Block 364 based on the monitored STATS message, Block 378. If the current scene or frame is determined to be the static scene mode 200, Yes in Block 380, the process is continued for the next frame. If the current scene or frame is not determined to be the static scene mode 200, No in Block 380, monitoring of image capture parameters associated with modules 150-160 is resumed, Block 382, updated image settings are generated, Block 372, and image capture device 100 transmits the current updated image settings to the processor 120, Block 374, and the process is continued for the next frame.

As described above, the present disclosure proposes techniques in an image capture device and a method of operation of an image capture device for reducing power consumption by transitioning from a dynamic scene mode to a static scene mode when the device is operating in certain static scene situations. For example, an adjustment circuit of an image capture device may be configured to monitor image parameters, generate updated image settings for the image capture device based on the monitored image parameters, and transmit the updated image settings to one or more processors configured to receive the transmitted updated image settings from the adjustment circuit. The received updated image settings may include instructions for configuring the one or more processors to perform image processing of the image capture device. The received updated image settings may configure the one or more processors to: determine to transition the image capture device from a dynamic scene mode to a static scene mode based on a first image parameter included in the monitored image parameters that is different from a second image parameter that the one or more processors use to determine to transition the image capture device from the static scene mode to the dynamic scene mode, cause the adjustment circuit to suspend generation of all or less than all of the updated image settings in response to determining to transition the image capture device from the dynamic scene mode to the static scene mode, and transition the image capture device from the dynamic scene mode to the static scene mode.

In one example, described above, the image parameters may include a first set of image parameters, and the monitored image parameters may include a first set of monitored image parameters, and subsequent to the transition of the image capture device from the dynamic scene mode to the static scene mode, the adjustment circuit is configured to monitor a second set of image parameters. Subsequent to the transition of the image capture device from the dynamic scene mode to the static scene mode, the one or more processors may be configured to: determine to transition the image capture device from the static scene mode to the dynamic scene mode based on the second image parameter included in the second set of image parameters, and transition the image capture device from the static scene mode to the dynamic scene mode.

In another example, described above, the one or more processors may be configured to cause the adjustment circuit to restart generation of updated image settings in response to determining to transition the image capture device from the static scene mode to the dynamic scene mode, and receive and be configured by the updated image settings generated by the adjustment circuit subsequent to causing the adjustment circuit to restart generation of updated image settings.

In another example, described above, the second image parameter may be an exposure index of a current frame, and wherein to determine whether to transition the image capture device from the static scene mode to the dynamic scene mode based on the second image parameter, the one or more processors may be configured to: compare the exposure index of the current frame to an exposure index of a previous frame, and determine to transition from the static scene mode to the dynamic scene mode in response to the exposure index of the current frame being approximately equal to the exposure index of the previous frame.

In another example, described above, the second image parameter may be R/G/B channel intensity, and wherein to determine to transition the image capture device from the static scene mode to the dynamic scene mode based on the second image parameter, the one or more processors may be configured to: determine, while in the static scene mode, a difference of the R/G/B channel intensity in corresponding regions between a current frame and a previous frame, generate a difference image based on the difference, compare values in the difference image to a difference range threshold, and determine to transition from the static scene mode to the dynamic scene mode based on to the comparing.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An image capture device, comprising:
   an adjustment circuit configured to monitor image parameters, generate updated image settings for the image capture device based on the monitored image parameters, and transmit the updated image settings; and
   one or more processors configured to receive the transmitted updated image settings from the adjustment circuit, wherein the received updated image settings comprise instructions for configuring the one or more processors to perform image processing of the image capture device, and wherein the updated image settings configure the one or more processors to:
   determine to transition the image capture device from a dynamic scene mode to a static scene mode based on a first image parameter included in the monitored image parameters, wherein the first image parameter used to determine to transition the image capture device from the dynamic scene mode to the static scene mode is different from a second image parameter that the one or more processors use to determine to transition the image capture device from the static scene mode to the dynamic scene mode,
   cause the adjustment circuit to suspend generation of all or less than all of the updated image settings in response to determining to transition the image capture device from the dynamic scene mode to the static scene mode, and
   transition the image capture device from the dynamic scene mode to the static scene mode.

2. The device of claim 1, wherein the first image parameter comprises an auto exposure control value, and the second image parameter comprises one or more statistics messages.

3. The device of claim 1, wherein the image parameters include a first set of image parameters, and the monitored image parameters comprise a first set of monitored image parameters,
   wherein, subsequent to the transition of the image capture device from the dynamic scene mode to the static scene mode, the adjustment circuit is configured to monitor a second set of image parameters,
   wherein, subsequent to the transition of the image capture device from the dynamic scene mode to the static scene mode, the one or more processors are configured to:
   determine to transition the image capture device from the static scene mode to the dynamic scene mode based on the second image parameter included in the second set of image parameters; and
   transition the image capture device from the static scene mode to the dynamic scene mode.

4. The device of claim 3, wherein the one or more processors are configured to:
   cause the adjustment circuit to restart generation of updated image settings in response to determining to transition the image capture device from the static scene mode to the dynamic scene mode, and
   receive and be configured by the updated image settings generated by the adjustment circuit subsequent to causing the adjustment circuit to restart generation of updated image settings.

5. The device of claim 3, wherein the second image parameter comprises an exposure index of a current frame, and wherein to determine whether to transition the image capture device from the static scene mode to the dynamic scene mode based on the second image parameter, the one or more processors are configured to:
   compare the exposure index of the current frame to an exposure index of a previous frame, and determine to transition from the static scene mode to the dynamic scene mode in response to the exposure index of the current frame being approximately equal to the exposure index of the previous frame.

6. The device of claim 3, wherein the second image parameter comprises R/G/B channel intensity, and wherein to determine to transition the image capture device from the static scene mode to the dynamic scene mode based on the second image parameter, the one or more processors are configured to:
   determine, while in the static scene mode, a difference of the R/G/B channel intensity in corresponding regions between a current frame and a previous frame, generate a difference image based on the difference, compare values in the difference image to a difference range threshold, and determine to transition from the static scene mode to the dynamic scene mode based on to the comparing.

7. The device of claim 1, wherein the one or more processors is configured to receive statistics data, and wherein the one or more processors are configured to determine, while in the dynamic scene mode, a total brightness in response to the received statistics data, and generate a mapping table mapping the total brightness to exposure indexes when in the dynamic scene mode.

8. The device of claim 1, wherein the first image parameter comprises an exposure index of a current frame, wherein to determine whether to transition the image capture device from the dynamic scene mode to the static scene mode based on the first image parameter, the one or more processors are configured to:
compare the exposure index of the current frame to an exposure index of a previous frame, increase a counter in response to the exposure index of the current frame being approximately equal to the exposure index of the previous frame, compare the counter to a threshold, and determine that the image capture device is to transition from the dynamic scene mode to the static scene mode in response to the counter being greater than the threshold.

9. The device of claim 8, wherein the threshold corresponds to sensitivity of the image capture device with respect to sensitivity to light change.

10. The device of claim 1, wherein the adjustment circuit comprises an auto exposure control module, an auto white balance module, and an autofocus module, and wherein the one or processors are configured to disable the auto white balance module and the autofocus module so that only parameters based on the auto exposure control module are updated by the adjustment circuit and received by the one or more processors when the device is in the static scene mode.

11. The device of claim 1, wherein the one or more processors are further configured to store updated image settings generated prior to transitioning the image capture device from the dynamic scene mode to the static scene mode, wherein the stored updated image settings are received by the one or more processors while the image capture device is in the static scene mode.

12. The device of claim 1, wherein the image capture device comprises a digital camera of a wireless communication device.

13. A method of operation in an image capture device, comprising:
monitoring, by an adjustment circuit, image parameters, generating updated image settings for the image capture device based on the monitored image parameters, and transmitting the updated image settings; and
receiving, by one or more processors, the transmitted updated image settings from the adjustment circuit, wherein the received updated image settings comprise instructions for configuring the one or more processors to perform image processing of the image capture device;
determining to transition the image capture device from a dynamic scene mode to a static scene mode based on a first image parameter included in the monitored image parameters, wherein the first image parameter used to determine to transition the image capture device from the dynamic scene mode to the static scene mode is different from a second image parameter used to determine to transition the image capture device from the static scene mode to the dynamic scene mode;
suspending generation of all or less than all of the updated image settings in response to determining to transition the image capture device from the dynamic scene mode to the static scene mode, and
transitioning the image capture device from the dynamic scene mode to the static scene mode.

14. The method device of claim 13, wherein the first image parameter comprises an auto exposure control value, and the second image parameter comprises one or more statistics messages.

15. The method of claim 13, wherein the image parameters include a first set of image parameters, and the monitored image parameters comprise a first set of monitored image parameters, and subsequent to the transitioning of the image capture device from the dynamic scene mode to the static scene mode, further comprising:
monitoring a second set of image parameters;
determining to transition the image capture device from the static scene mode to the dynamic scene mode based on the second image parameter included in the second set of image parameters, and
transitioning the image capture device from the static scene mode to the dynamic scene mode.

16. The method of claim 15, further comprising:
restarting generation of updated image settings in response to determining to transition the image capture device from the static scene mode to the dynamic scene mode;
receiving, by the one or more processors, the updated image settings generated by the adjustment circuit subsequent to causing the adjustment circuit to restart generation of updated image settings; and
configuring the one or more processors based on the received updated image settings generated by the adjustment circuit subsequent to causing the adjustment circuit to restart generation of updated image settings.

17. The method of claim 15, wherein the second image parameter comprises an exposure index of a current frame, and further comprising:
comparing the exposure index of the current frame to an exposure index of a previous frame; and
determining to transition from the static scene mode to the dynamic scene mode based on to the exposure index of the current frame being approximately equal to the exposure index of the previous frame.

18. The method of claim 15, wherein the second image parameter comprises R/G/B channel intensity, and further comprising:
determining, while in the static scene mode, a difference of the R/G/B channel intensity in corresponding regions between a current frame and a previous frame;
generating a difference image based on the difference;
comparing values in the difference image to a difference range threshold; and
determining to transition from the static scene mode to the dynamic scene mode based on to the comparing.

19. The method of claim 13, further comprising:
receiving statistics data;
determining, while in the dynamic scene mode, a total brightness in response to the received statistics data; and
generating a mapping table mapping the total brightness to exposure indexes when in the dynamic scene mode.

20. The method of claim 13, wherein the first image parameter comprises an exposure index of a current frame, and further comprising:
comparing the exposure index of the current frame to an exposure index of a previous frame;
increasing a counter based on the exposure index of the current frame being approximately equal to the exposure index of the previous frame;
comparing the counter to a threshold; and determining that the image capture device is to transition from the dynamic scene mode to the static scene mode based on the counter being greater than the threshold.

21. The method of claim 20, wherein the threshold corresponds to sensitivity of the image capture device with respect to sensitivity to light change.

22. The method of claim 13, wherein the adjustment circuit comprises an auto exposure control module, an auto white balance module, and an autofocus module, and further comprising disabling the auto white balance module and the autofocus module so that only parameters based on the auto exposure control module are updated by the adjustment circuit and received by the one or more processors when the device is in the static scene mode.

23. The method of claim 13, further comprising:
storing updated image settings generated prior to transitioning the image capture device from the dynamic scene mode to the static scene mode; and
receiving, by the one or more processors, the stored updated image settings while the image capture device is in the static scene mode.

24. A computer-readable medium storing instructions that, when executed, cause one or more processors to:
monitor image parameters, generate updated image settings for an image capture device based on the monitored image parameters, and transmit the updated image settings;
receive the transmitted updated image settings, wherein the received updated image settings comprise instructions for configuring the one or more processors to perform image processing of the image capture device;
determine to transition the image capture device from a dynamic scene mode to a static scene mode based on a first image parameter included in the monitored image parameters, wherein the first image parameter used to determine to transition the image capture device from the dynamic scene mode to the static scene mode is different from a second image parameter used to determine to transition the image capture device from the static scene mode to the dynamic scene mode;
suspend generation of all or less than all of the updated image settings in response to determining to transition the image capture device from the dynamic scene mode to the static scene mode; and
transition the image capture device from the dynamic scene mode to the static scene mode.

25. The computer-readable medium of claim 24, wherein the first image parameter comprises an auto exposure control value and the second image parameter comprises one or more statistics messages.

26. The computer-readable medium of claim 24, wherein the image parameters include a first set of image parameters, and the monitored image parameters comprise a first set of monitored image parameters,
wherein, subsequent to the transition of the image capture device from the dynamic scene mode to the static scene mode, the one or more processors are configured to:
monitor a second set of image parameters;
determine to transition the image capture device from the static scene mode to the dynamic scene mode based on the second image parameter included in the second set of image parameters; and transition the image capture device from the static scene mode to the dynamic scene mode.

27. The computer-readable medium of claim 26, wherein the one or more processors are configured to:
restart generation of updated image settings in response to determining to transition the image capture device from the static scene mode to the dynamic scene mode, and
receive and be configured by the updated image settings subsequent to restarting generation of updated image settings.

28. The computer-readable medium of claim 26, wherein the second image parameter comprises an exposure index of a current frame, and wherein to determine whether to transition the image capture device from the static scene mode to the dynamic scene mode based on the second image parameter, the one or more processors are configured to:
compare the exposure index of the current frame to an exposure index of a previous frame, and determine to transition from the static scene mode to the dynamic scene mode in response to the exposure index of the current frame being approximately equal to the exposure index of the previous frame.

29. The computer-readable medium of claim 26, wherein the second image parameter comprises R/G/B channel intensity, and wherein to determine to transition the image capture device from the static scene mode to the dynamic scene mode based on the second image parameter, the one or more processors are configured to:
determine, while in the static scene mode, a difference of the R/G/B channel intensity in corresponding regions between a current frame and a previous frame, generate a difference image based on the difference, compare values in the difference image to a difference range threshold, and determine to transition from the static scene mode to the dynamic scene mode based on to the comparing.

30. An image capture device, comprising:
means for monitoring image parameters, generating updated image settings for the image capture device based on the monitored image parameters, and transmitting the updated image settings;
means for receiving the transmitted updated image settings from the adjustment circuit, wherein the received updated image settings comprise instructions for configuring the one or more processors to perform image processing of the image capture device;
means for determining to transition the image capture device from a dynamic scene mode to a static scene mode based on a first image parameter included in the monitored image parameters, wherein the first image parameter used to determine to transition the image capture device from the dynamic scene mode to the static scene mode is different from a second image parameter used to determine to transition the image capture device from the static scene mode to the dynamic scene mode;
means for suspending generation of all or less than all of the updated image settings in response to determining to transition the image capture device from the dynamic scene mode to the static scene mode; and
means for transitioning the image capture device from the dynamic scene mode to the static scene mode.

* * * * *